(12) United States Patent
Sayegh et al.

(10) Patent No.: US 9,832,431 B2
(45) Date of Patent: Nov. 28, 2017

(54) PUBLIC VIEW MONITOR WITH TAMPER DETERRENT AND SECURITY

(71) Applicant: USS Technologies, LLC, Rancho Cucamonga, CA (US)

(72) Inventors: Adel O. Sayegh, Rancho Cucamonga, CA (US); Gerald Becker, Rancho Cucamonga, CA (US); Edgardo Redublo, Rancho Cucamonga, CA (US); Daniel Hwang, Placentia, CA (US); Sung Jong Kim, Placentia, CA (US)

(73) Assignee: USS Technologies, LLC, Rancho Cucamonga, CA (US)

( * ) Notice: Subject to any disclaimer, the term of this patent is extended or adjusted under 35 U.S.C. 154(b) by 427 days.

(21) Appl. No.: 14/147,459

(22) Filed: Jan. 3, 2014

(65) Prior Publication Data

US 2014/0192191 A1 Jul. 10, 2014

Related U.S. Application Data

(60) Provisional application No. 61/749,167, filed on Jan. 4, 2013.

(51) Int. Cl.
| | |
|---|---|
| *H04N 7/18* | (2006.01) |
| *G06F 21/88* | (2013.01) |
| *G08B 29/04* | (2006.01) |
| *G08B 13/14* | (2006.01) |
| *G06F 21/87* | (2013.01) |

(52) U.S. Cl.
CPC ............ *H04N 7/183* (2013.01); *G06F 21/88* (2013.01); *G08B 13/149* (2013.01); *G08B 13/1436* (2013.01); *G08B 13/1472* (2013.01); *G08B 29/046* (2013.01); *G06F 21/87* (2013.01)

(58) Field of Classification Search
CPC .......... G06F 21/86; G06F 21/87; G06F 21/70; G06F 21/88; G08B 13/128; G08B 29/046; G08B 13/1436; G08B 13/1472; G08B 13/149
USPC ......... 348/150, 158; 340/532, 539.31, 545.6, 340/568.1
See application file for complete search history.

(56) References Cited

U.S. PATENT DOCUMENTS

| | | | | |
|---|---|---|---|---|
| 5,278,643 A * | 1/1994 | Takemoto | ............ | A63F 7/0058 348/150 |
| 6,583,813 B1 * | 6/2003 | Enright | .................. | G06Q 20/18 348/143 |
| 7,321,303 B2 * | 1/2008 | Chen | ................ | G08B 13/19619 340/539.31 |
| 7,519,703 B1 * | 4/2009 | Stuart | ................... | G06F 21/554 709/217 |
| 7,571,491 B2 * | 8/2009 | Nakanishi | ............... | G06F 21/86 713/194 |
| 7,595,816 B1 * | 9/2009 | Enright | .................. | G06Q 20/18 348/143 |
| 7,852,210 B2 * | 12/2010 | Merritt | ................... | G08B 13/02 340/540 |
| 8,068,035 B1 * | 11/2011 | Salcedo | ................ | E04H 13/003 320/101 |

(Continued)

*Primary Examiner* — John Villecco
(74) *Attorney, Agent, or Firm* — Milord A. Keshishian

(57) ABSTRACT

The present invention provides a device, comprising one or more embedded tamper deterrent and security systems that trigger an alarm if the device is tampered.

30 Claims, 29 Drawing Sheets

(56) References Cited

U.S. PATENT DOCUMENTS

| | | | |
|---|---|---|---|
| 8,842,178 B2 * | 9/2014 | Saeki | G08B 13/19604 348/143 |
| 8,884,757 B2 * | 11/2014 | Sasson | G08B 13/22 340/5.7 |
| 2003/0137416 A1 * | 7/2003 | Fu | G06F 21/86 340/568.1 |
| 2006/0158548 A1 * | 7/2006 | Broemmelsiek | G08B 25/003 348/373 |
| 2007/0247526 A1 * | 10/2007 | Flook | G03B 17/18 348/161 |
| 2008/0152232 A1 * | 6/2008 | Skans | G08B 29/046 382/209 |
| 2010/0128126 A1 * | 5/2010 | Takeuchi | G08B 13/1961 348/143 |
| 2011/0205360 A1 * | 8/2011 | Saeki | G08B 13/19604 348/143 |
| 2011/0221895 A1 * | 9/2011 | Sharma | H04N 7/188 348/143 |
| 2011/0261195 A1 * | 10/2011 | Martin | G08B 13/19697 348/143 |
| 2012/0154581 A1 * | 6/2012 | Wang | G08B 29/046 348/143 |
| 2012/0194339 A1 * | 8/2012 | Terugu | H04W 52/0251 340/539.31 |
| 2012/0274776 A1 * | 11/2012 | Gupta | G08B 13/19641 348/143 |
| 2013/0002864 A1 * | 1/2013 | Lundberg | H04N 17/002 348/143 |
| 2013/0155242 A1 * | 6/2013 | Hevia | G08B 13/19658 348/152 |
| 2013/0293718 A1 * | 11/2013 | M | G08B 13/19669 348/152 |
| 2014/0253725 A1 * | 9/2014 | Hsu | H04N 5/2251 348/143 |
| 2015/0135021 A1 * | 5/2015 | Robison | G06F 21/6263 714/55 |
| 2015/0269805 A1 * | 9/2015 | Korala | G06F 21/86 713/194 |

* cited by examiner

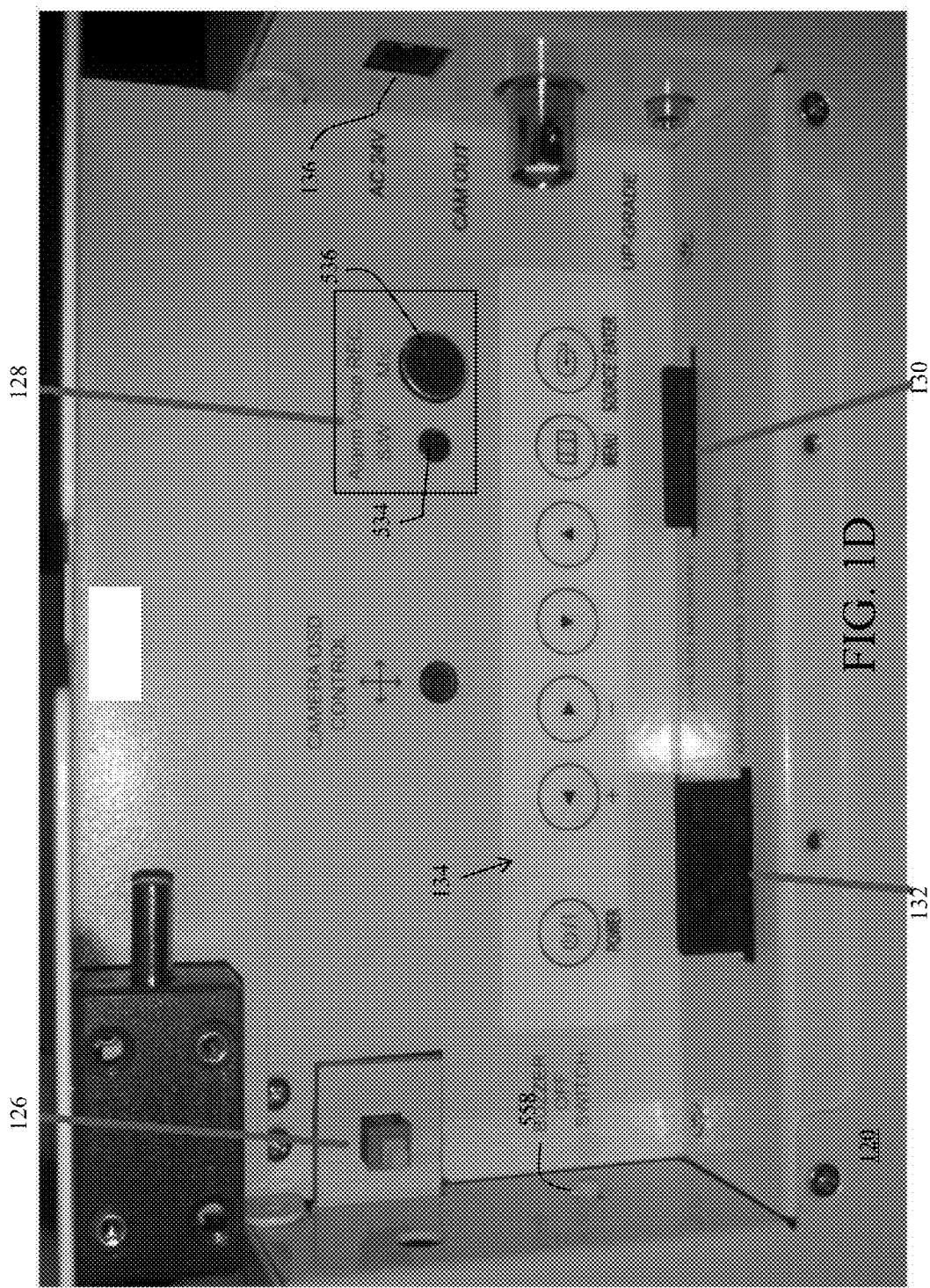

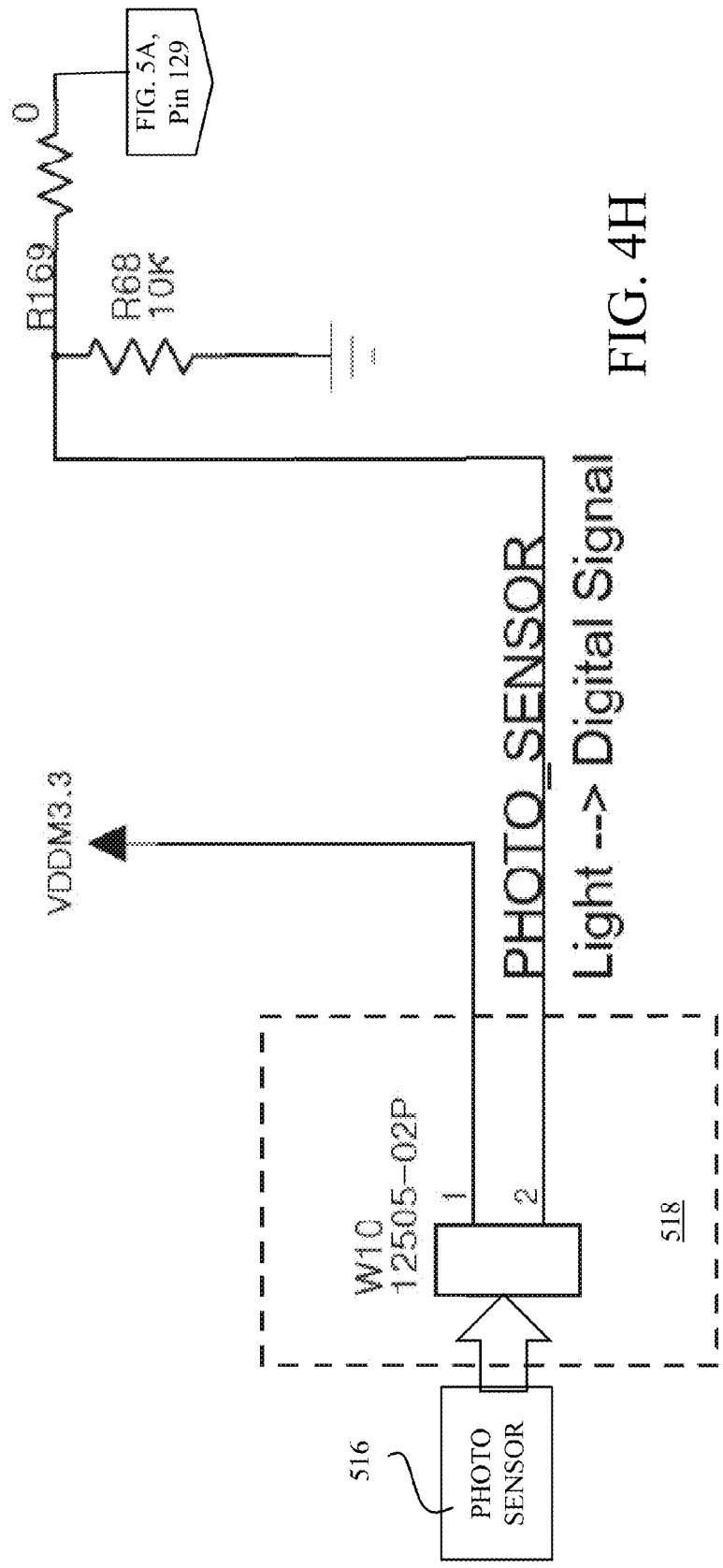

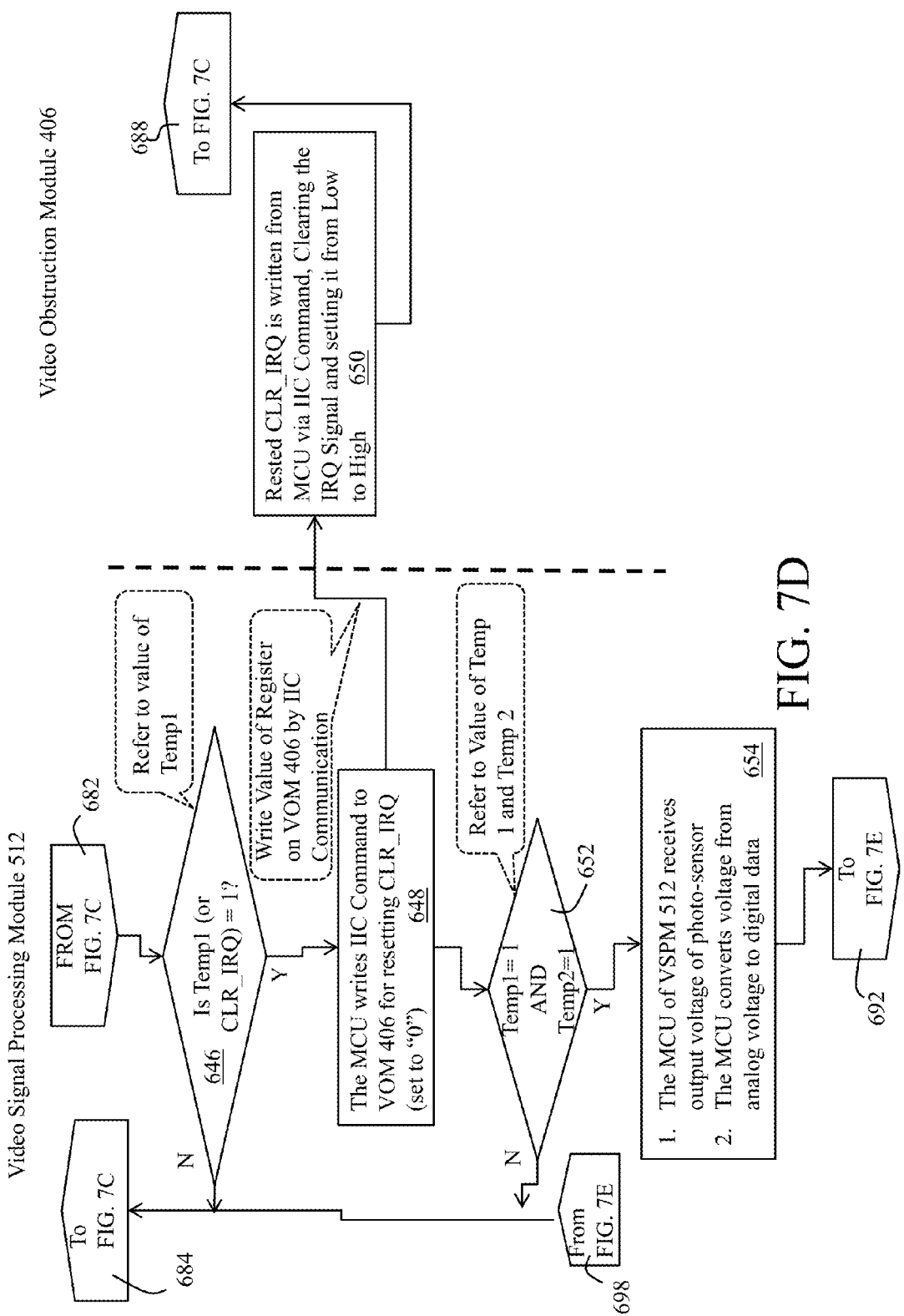

PUBLIC VIEW MONITOR WITH TAMPER DETERRENT AND SECURITY

CROSS-REFERENCE TO RELATED APPLICATIONS

This application claims the benefit of priority of the co-pending U.S. Provisional Utility Patent Application No. 61/749,167, titled, Public View Monitor System with Multiple Alarms, filed Jan. 4, 2013, the entire disclosure of which is expressly incorporated by reference herein. Where a definition or use of a term in an incorporated reference is inconsistent or contrary to the definition of that term provided herein, the definition of that term provided herein applies and the definition of that term in the incorporated reference does not apply.

BACKGROUND OF THE INVENTION

Field of the Invention

The present invention relates to public view monitor systems for loss prevention monitoring via visual live view camera stream and more particularly, to public view monitors that include one or more tamper deterrent and security systems such as multiple audible alarms that trigger if the public viewing monitor is tampered.

Description of Related Art

Conventional public view monitors are well known and have been in use for a number of years. Today's conventional public view monitors include an embedded recording camera, are conspicuously mounted at or near a point of sale and at eyelevel, but regrettably, they are constantly tampered with by individuals either intentionally or unintentionally. An example of an unintentional tampering with conventional public view monitors is when large moving equipment accidentally bumps against the public view monitor and changes its view/recordation orientation. Obvious examples of intentional tampering occurs through obstruction of the recording camera view (lens), change its orientation, severed power to the public view monitor, and so on.

Accordingly, in light of the current state of the art and the drawbacks to current public view monitor systems mentioned above, a need exists for an eyelevel installed public view monitor system with an embedded camera that would include multiple tamper deterrent and security features, such as audible alarms that trigger if tampering occurs.

BRIEF SUMMARY OF THE INVENTION

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

A non-limiting, exemplary aspect of an embodiment of the present invention provides a device, comprising one or more embedded tamper deterrent and security systems that trigger an alarm if the device is tampered with.

Another non-limiting, exemplary aspect of an embodiment of the present invention provides a device, comprising a public view monitor that includes one or more tamper deterrent and security systems that trigger an alarm if the public view monitor is tampered with.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

FIGS. 1A to 1E are non-limiting, exemplary illustration of various views of a public view monitor in accordance with one or more embodiments of the present invention;

FIGS. 7A to 7E are non-limiting, exemplary flowcharts that detail a cooperative relationship between a video obstruction board and a video signal processing board.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers. Further, each block within a flowchart may represent both method and one or more elements for performing the method. In addition, depending upon the implementation, the corresponding one or more elements may be configured in hardware, software, firmware, or combinations thereof.

One or more embodiments of the present invention provide a public view monitor system with an embedded camera that may be conspicuously mounted at eyelevel that includes multiple tamper deterrent and security systems that may include audio-visual alarms that trigger if the public viewing monitor is tampered with.

Figure 1B:
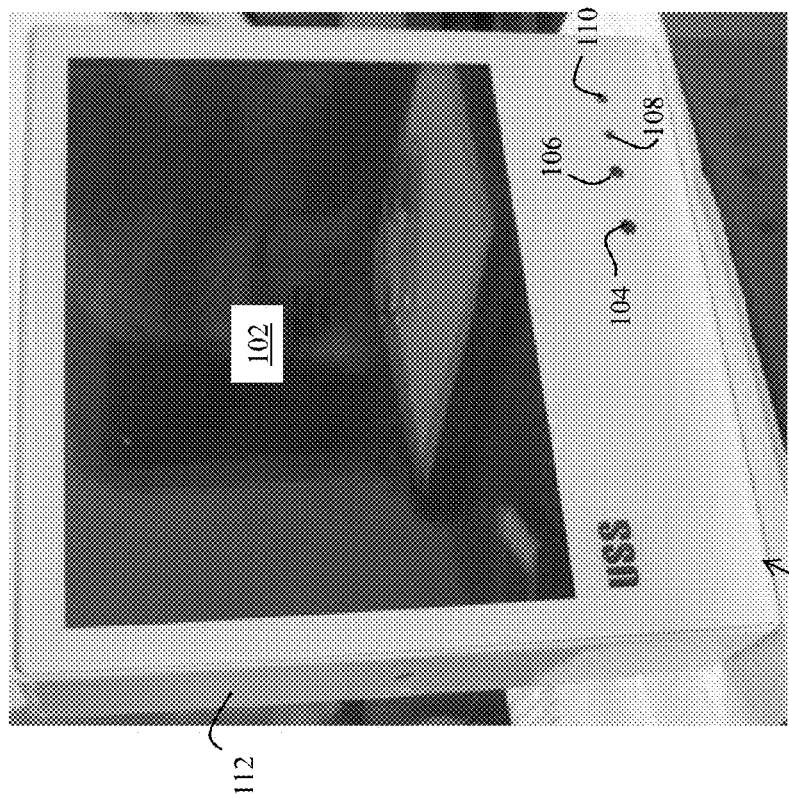
Figure 1A:
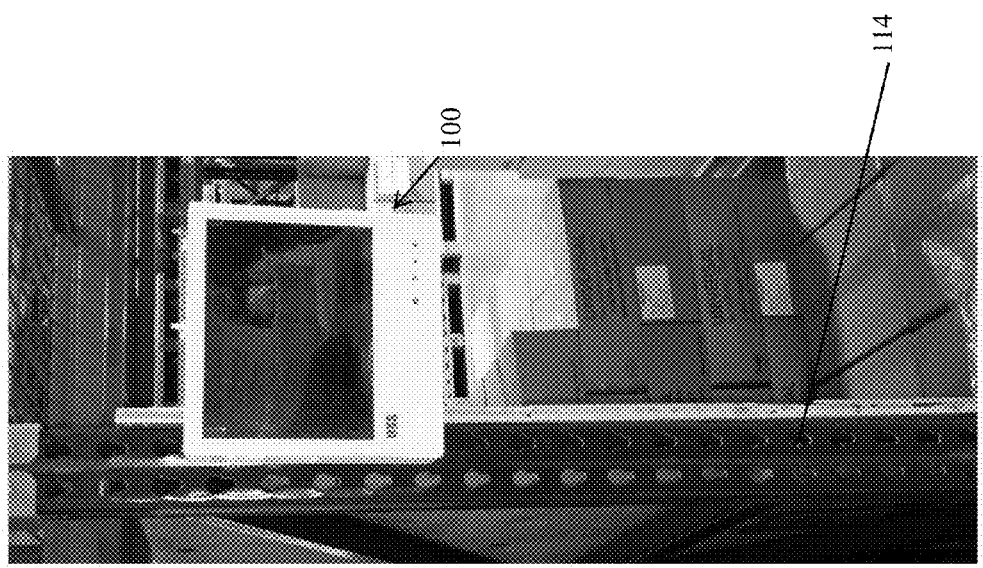

FIG. 1A is a non-limiting, exemplary illustration of a public view monitor mounted onto a structure in accordance with one or more embodiments of the present invention, and FIG. 1B is a close-up of the same. As illustrated in FIGS. 1A and 1B, one or more embodiments of the present invention provide a public view monitor 100 that includes a housing 112 that enables securing the public view monitor 100 to a structure 114. The front side of the housing 112 of the public view monitor 100 includes an opening for accommodating a display 102, a first aperture 104 for accommodating a viewable section for a lens of a built-in camera 502 (FIG. 4C-1), a second aperture 106 for accommodating an IR sensor, a third aperture 108 for accommodating a power light (e.g., a light emitting diode (LED)) that indicates if the public view monitor is powered ON, and a fourth aperture 110 for accommodating an indicator recording light (e.g., LED). The lens of the built-in camera 502 via the first aperture 104 records video images, with the public view monitor providing visual live camera view stream on the display 102.

Figure 1C:
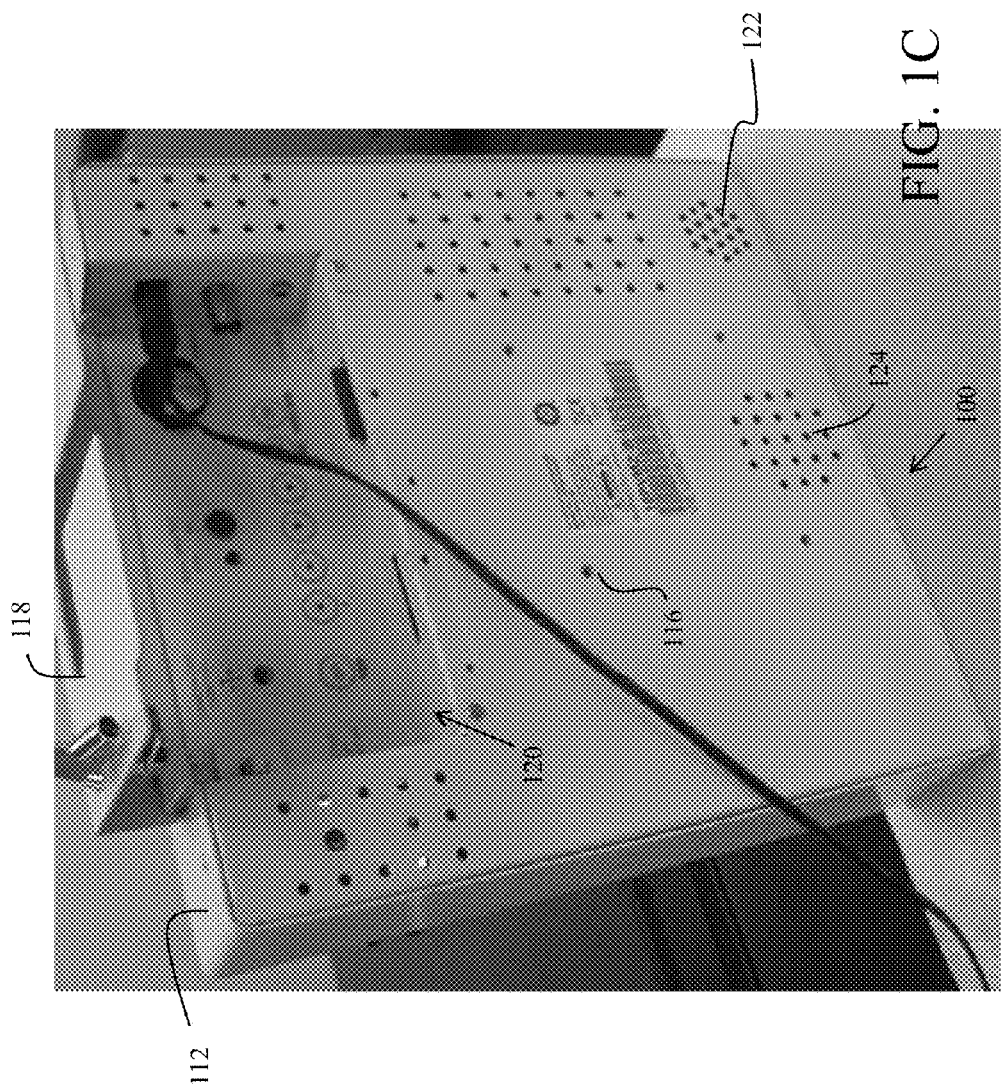

FIGS. 1C and 1D are non-limiting, exemplary illustration of a back side of the public view monitor illustrated in FIGS. 1A and 1B in accordance with one or more embodiments of the present invention. As illustrated in FIGS. 1C and 1D, the public view monitor has a back-panel 118 that prevents unauthorized access to a compartment 120 (close up illustrated in FIG. 1D) that houses control modules for power, tamper deterrent and security systems, and one or more media players with respective one or more removable-media, all of which are detailed below.

Figure 1E:
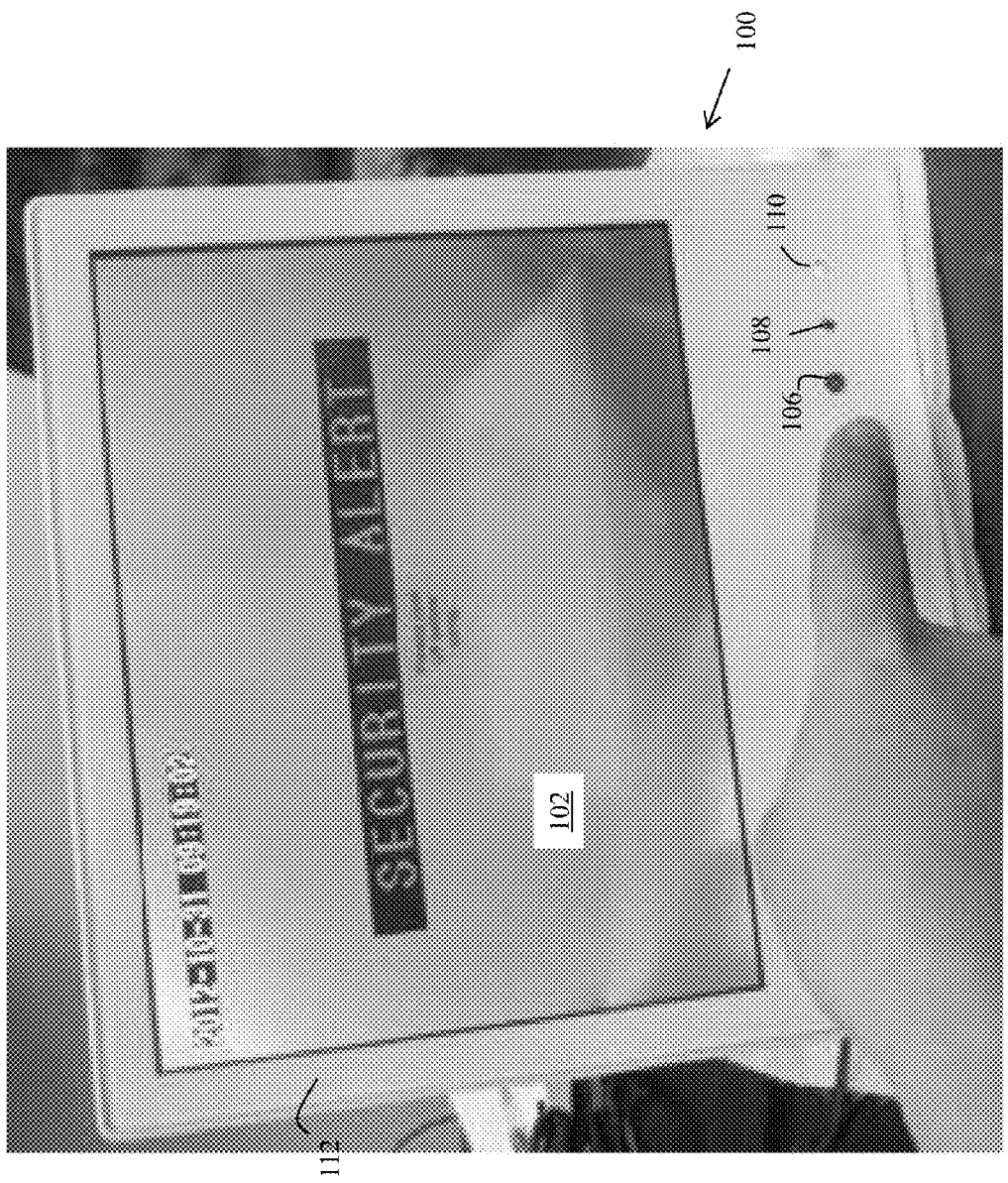

As best illustrated in FIG. 1E, if the public view monitor 100 is tampered with (e.g., the lens viewable area via the aperture 104 is obstructed or blocked as illustrated), the tamper deterrent and security systems of the public view monitor 100 generate an audio-visual security alert in addition to transmitting a wireless security alert signal to a central point. A wireless upload of monitor video files are also provided in accordance with the present invention which provides the user the option to be able to wirelessly upload the video files captured from an internal media player (e.g., mini-Digital Video Recorder (DVR)) 504 (FIG. 4C-1) to a central point. Well known, conventional wireless transmission protocols via well-known wireless networking infrastructure may be used for transmitting data. It should be noted that the transmission may be fully encrypted via the network setting set by authorized users. A central location is configured to capture all files from the public view monitor 100 to then be reviewed at a later time.

Figure 2:
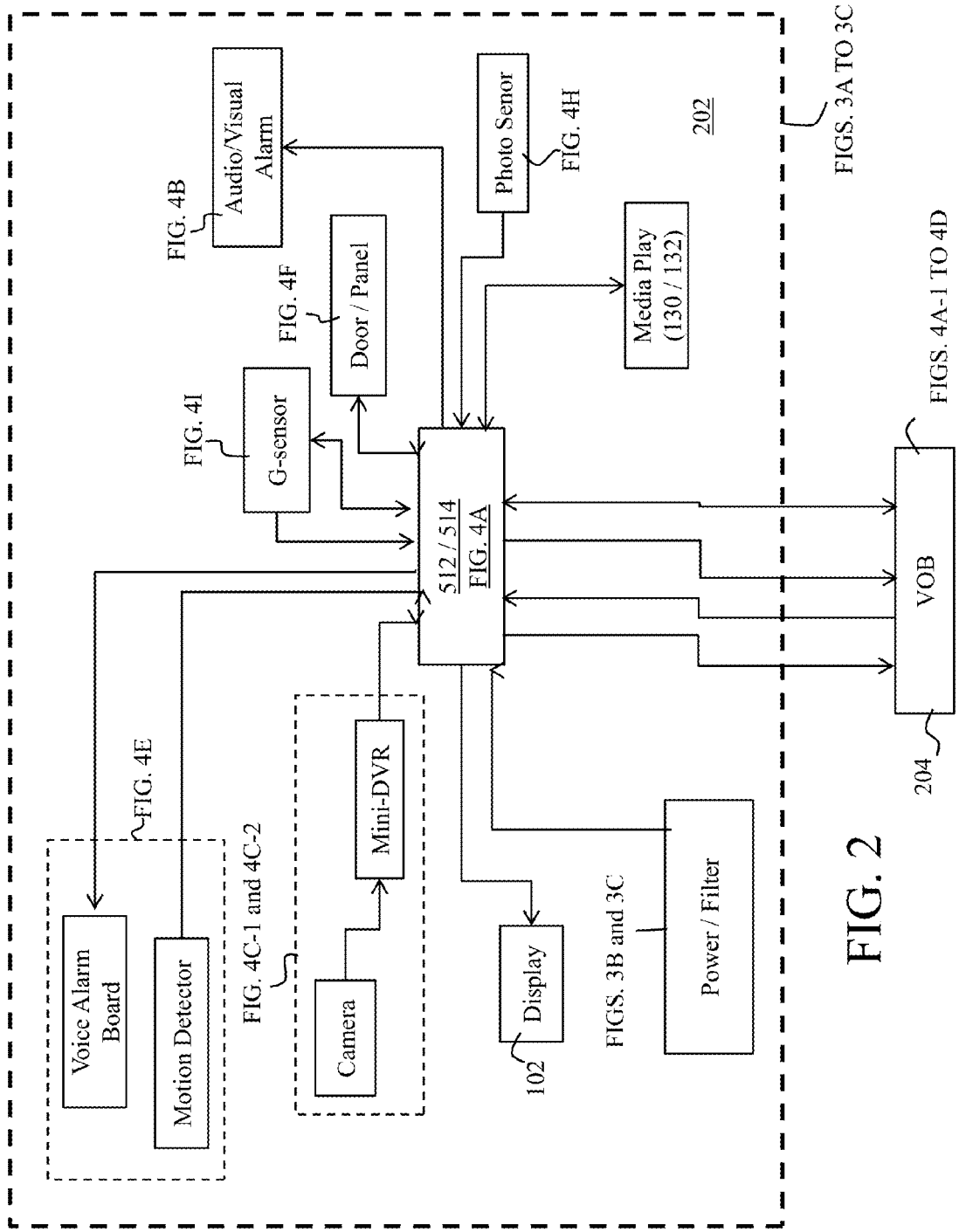
FIG. 2 is a non-limiting, exemplary system block diagram illustrating an overview of the public view monitor in accordance with one or more embodiments of the present invention.

FIG. 2 is a non-limiting, exemplary systems overview of the public view monitor in accordance with one or more embodiments of the present invention. As illustrated, the public view monitor 100 generally includes a video signal processing board 202 (generally shown as the dashed line referenced as 202) that has a video signal processing module 512 (detailed in FIG. 4A) that processes and manages video, audio, tamper deterrent and security systems, and video signal processing board power systems. Also illustrated is a video obstruction board 204 that includes a video obstruction module 406 (FIGS. 6A-1 to 6D) for processing video signals communicated from the video signal processing module 512 to determine obstruction of the camera 502, and to process video obstruction board power systems. It should be noted that the video signal processing board 202 and the video obstruction board 204 may be implemented on the same board and need not be separate as illustrated. As further illustrated in FIG. 2, the public view monitor 100 is comprised of various subsystems and modules that when combined, provide one or more embedded tamper deterrent and security systems that may include any one or more of a signal loss detection, an obstruction detection, orientation detection for determining the orientation the monitor (view angle of the camera lens), unauthorized access detection to the back compartment 120, detection of unauthorized removal of removable-media, motion detection, and or power loss detection, all of which are detailed below.

Figure 3A:
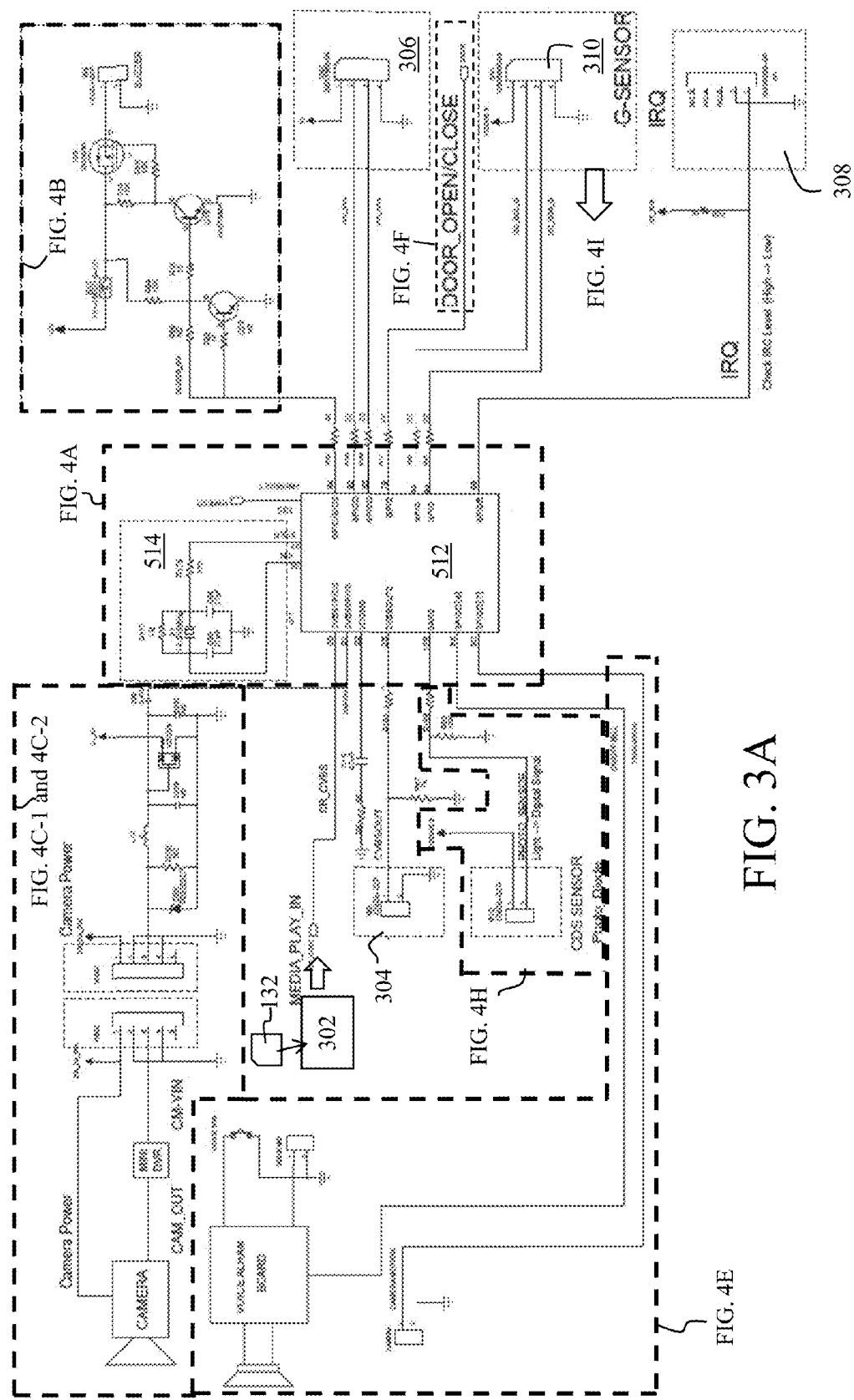
FIGS. 3A to 3C are non-limiting, exemplary schematic diagrams of a video signal processing board illustrated in FIG. 2 in accordance with one or more embodiments of the present invention, further details of which are illustrated in FIGS. 4A to 4I.
Figures 3B, 3C:
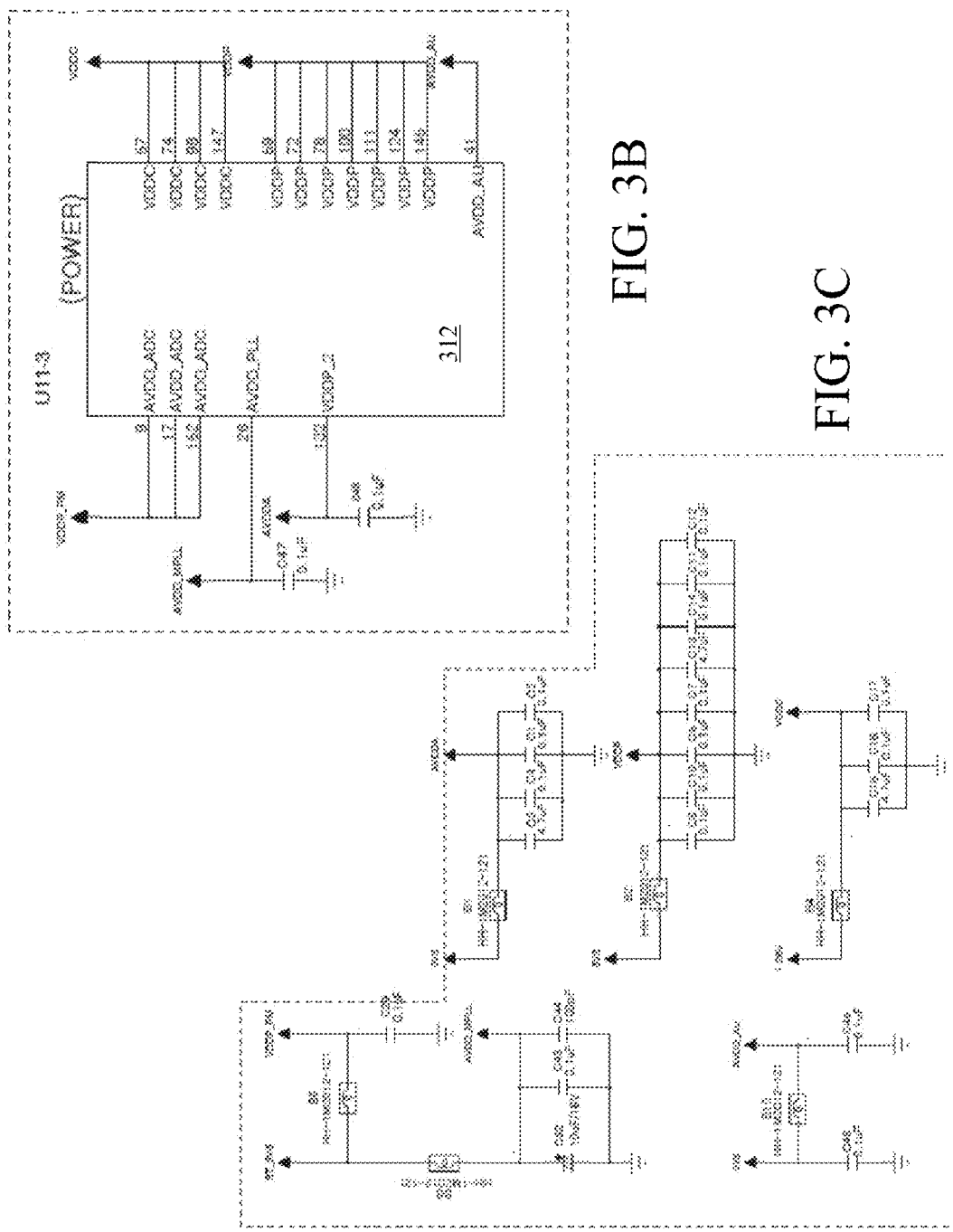

FIGS. 3A to 3C are non-limiting, schematic diagrams of the video signal processing board illustrated in FIG. 2 in accordance with the present invention, further details of which are exemplarily illustrated in FIGS. 4A to 4H. The details of the circuit schematics (the power system for the video signal process board 202) illustrated in FIGS. 3B and 3C are well known and include a well known power chip 312 (FIG. 3B) and a well known power filtering system (FIG. 3C) to provide clean power to the video signal processing board 202. A non-limiting example of a power chip 312 is readily available and manufactured by MSTAR, chip model MST-7871.

Figure 4A:
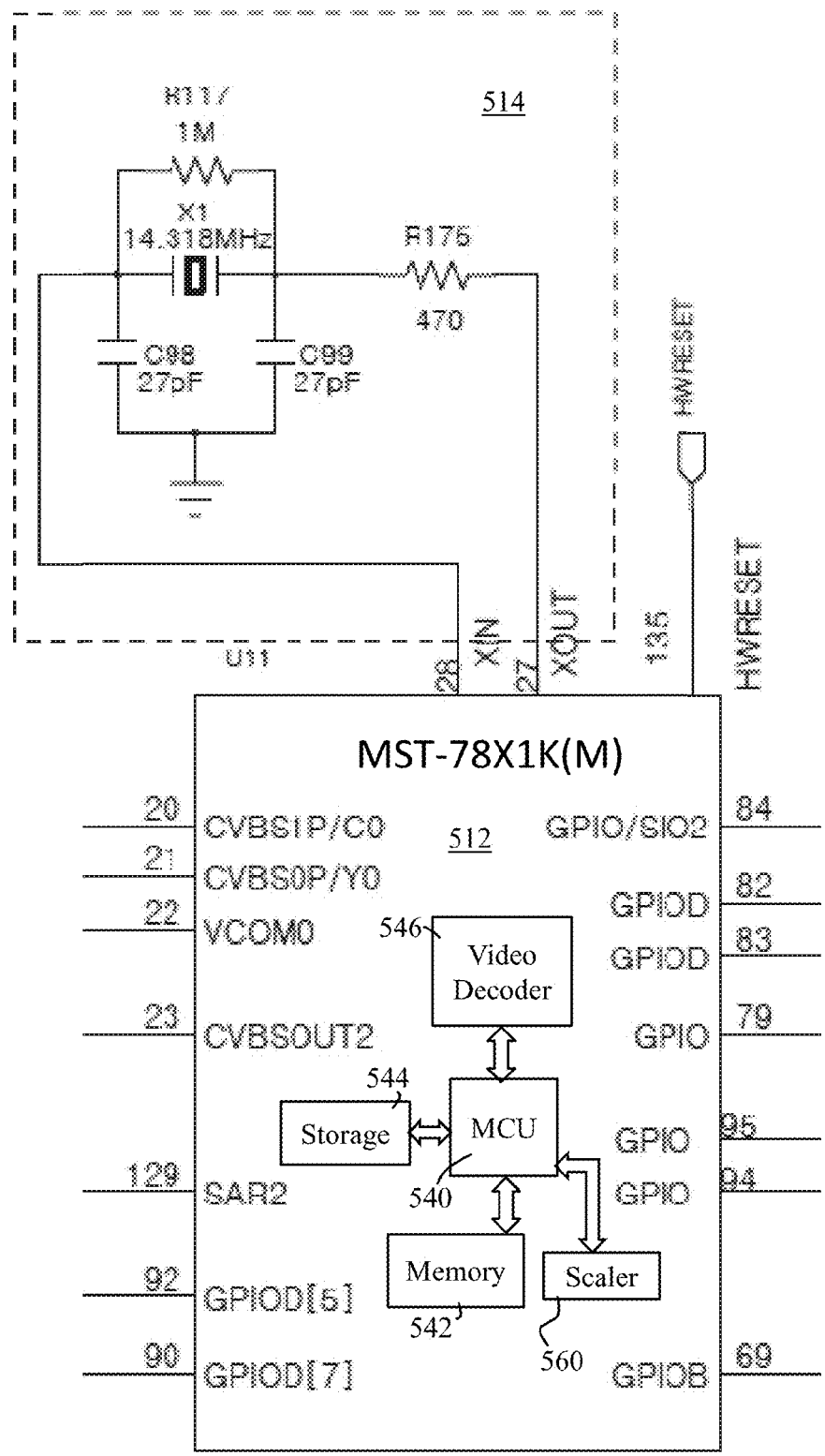

As illustrated in FIG. 3A, the video signal processing board 202 is comprised of a video signal processing module 512, the details of which are illustrated in FIG. 4A. Referring to FIG. 4A, the video signal processing module 512 is a well known video scaler. The video signal processing module 512 in general, is well known and includes more input/output (I/O) ports than those which are illustrated in FIG. 4A. However, it is only for simplicity and discussion purposes that only a few I/O ports are illustrated and described, with the remaining I/O ports having well known functionalities. For example, the video signal processing module 512 can receive and process analog Composite Video Baseband Signal (CVBS) as well as others types of video signals such as Video Graphics Array (VGA) signals, High Definition Multimedia Interface (HDMI) signals, Digital Visual Interface (DVI) signals, etc. However, for purposes of illustration, only the analog CVB signal is discussed in relation to the input port 21 of the video signal-processing module 512. As another example, the video signal processing module 512 outputs processed digital video signal to the display panel 102 via a well-known Low Voltage Digital Signal (LVDS) output port that is also not shown in detail for simplicity. Non-limiting example of a specific type of video signal processing module 512 that may be used with the public view monitor 100 of the present invention may include the MST-78X1K(M), which is well known and readily available and manufactured by MSTAR SEMICONDUCTORS™ (www.mstarsemi.com).

As further illustrated in FIG. 4A, the video signal processing module 512 includes at least a microcontroller unit (MCU) 540 that processes all signals in accordance with the present invention (detailed below). Further included in the video signal processing module 512 is video decoder functionality 546 that has an analog to digital (A/D) and digital to analog (D/A) converter in addition to a decoder for decoding video signals for further processing and display. The video decoders 546 may be implemented in software and or hardware and are well known. They are used to extract information from (and hence, decode) a video signal. Non-limiting examples of information extracted from a digital video signal by a video decoder may include luma, color information, frame synchronization, etc. Further included in the video signal processing module 512 is a well known scaler functionality 560 that converts the received video signal from one display resolution to another. The video signal processing module 512 further includes storage 544 for storing executable data and memory 542 for performing processing tasks. It should be noted that processing of signals by the video signal processing module 512 is based on the clock signals generated by the well-known crystal oscillator 514 at a desired frequency. That is, a clock rate of the video signal processing module 512 is determined by a frequency of an oscillator 514 (connected via I/O ports 27 and 28 of video signal processing module 512).

As indicated above, the public view monitor 100 includes one or more tamper deterrent and security systems that trigger an alarm if the public view monitor 100 is tampered.

Figure 4B:
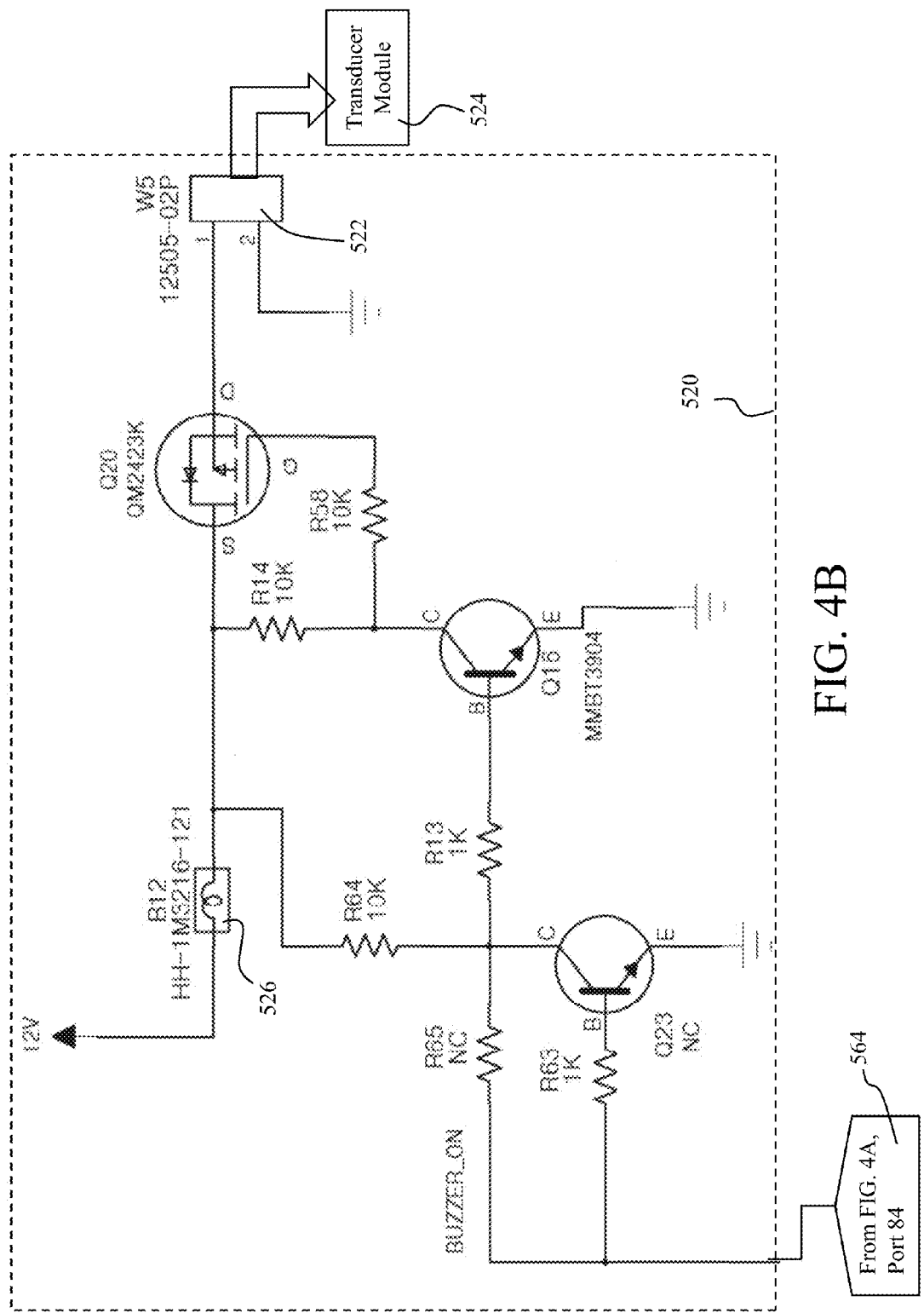

Accordingly, as illustrated in FIGS. 3A and 4B, the public view monitor 100 includes transducer circuit 520 for actuating a transducer module 524 to generate an audible alarm. When an alarm condition exists, the MCU 540 of the video signal processing module 512 forwards an alarm voltage signal via an output port 84 to the well known transducer circuit 520 to actuate a well known transducer module 524 connected to the transducer circuit 520 via a connector 522. That is, the alarm voltage signal from the video signal processing module 512 via the output port 84 (shown as connected to the transducer circuit 520 via an off-page connector 564 on FIG. 4B) biases ON the illustrated first and second NPN Bipolar Junction Transistors (BJT), which amplify the incoming alarm signal to bias the Metal Oxide Semiconductor Field Effect Transistor (MOSFET) to ON (which functions as a "relay switch"), which enables a 12 volt signal to pass through an inductor 526 to actuate the transducer module 524 and generate an audible alarm which is emanated and heard through the set of audio-holes 122 at the back of the public view monitor 100 (shown in FIG. 1C). It should be noted that the number and variety of types of transducer circuits 520 and the transducer module 524 available are too numerous to mention, thus the details of the transducer circuit 520 and the transducer module 524 are only non-limiting examples provided for discussion purposes.

Referring back to FIG. 3A and FIGS. 4C-1, and 4C-2, the public view monitor 100 includes the embedded camera 502 for recording video via a first media player in a form of a mini-DVR 504, and a display 102 for displaying the recorded images. It should be noted that the public view monitor 100 includes a remote controller (that communicates with the IR sensor accommodating at aperture 106) and embedded feature control modules in a non-limiting exemplary form of On Screen Display Menus that may be used to remotely control various functions and features of the public view monitor 100, which are well known in the video/display industry. A few, non-limiting examples of feature control modules may include enabling manipulation of images such as resolution, contrast, brightness, hue, saturation, varying video quality (frame rate, etc.), and others. Other features include setup functions (e.g., date/time functions), audio functions, recording functions, activation/deactivation and full control of media players and content of removable media, etc., very similar to a television or other analog and or digital video recorder using a remote control. In addition to embedded feature control modules indicated above, the public view monitor 100 further includes tamper deterrent and security control modules that control and enable functionalities of the one or more tamper deterrent and security systems via a password protected On Screen Display Menus that may be used to set, control, and vary functions and features of the one or more tamper deterrent and security systems by an authorized user, including activation/deactivation of any selected one or more of the tamper deterrent and security systems using a remote controller. Further included are privacy features that enable selective masking over an already recorded image or parts thereof.

Referring to FIGS. 3A, and 4C-1 and 4C-2, the embedded camera 502 records and transmits analog video signals to a first media player 504. The first media player 504 converts the transmitted analog video signal into a first digital signal via an internal Analog to Digital A/D converter for storage onto a first removable media 130. As with most conventional security recording systems, the recording is stored for later analysis by authorized users. The first media player 504 converts the stored first digital signal into the analog video signal via a Digital to Analog D/A converter, and transmits the analog video signal to a well known noise filter module 510 on a video signal processing board 202. It should be noted that an alarm may trigger if a removable media is not present within a media player. The camera module (illustrated in FIG. 4C-1) and the noise filter module 510 (shown in FIG. 4C-2, which is on the video signal processing board 202) are coupled by a set of connectors 506 and 508. The analog video signal transmitted by the camera 502 is a Composite Video Baseband Signal (CVBS), and as indicated above, the first media player 504 is a mini-digital video recorder. As further illustrated in FIG. 4C-2, the filtered analog signal (CVBS) is output from the filer module 510 to an input port 21 of the video signal processing module 512 (illustrated in FIG. 4A) via the illustrated off-page connector 560 (shown in FIG. 4C-2). The video signal processing module 512 receives the transmitted analog video signal from the first media player 504 (via the filter module 510) and converts the analog video signal to digital video signal via the video decoder 546 for further processing, one of which includes display of recorded video on a display panel 102 to generate a visual live camera view stream. More specifically, the analog signal received is converted to digital signal and transmitted to the display panel 102 via Low Voltage Differential Signal (LVDS) for display or showing of live captured images (or video).

As indicated above, the video signal processing module 512 includes a video decoder 546 that also has the function that detects presents or absence of video signals (at the input port 21 of the video signal processing module 512). The detected presence or absence of video signal by the video decoder 546 is communicated with the MCU 540 of the video signal processing module 512. If no video signal is detected at port 21 of the video signal processing module 512, the MCU 540 determines if an alarm feature for lack of video signal was set to be activate and, if so, MCU 540 transmits a signal to trigger alarm (FIG. 4B).

Figures 1, 4C:
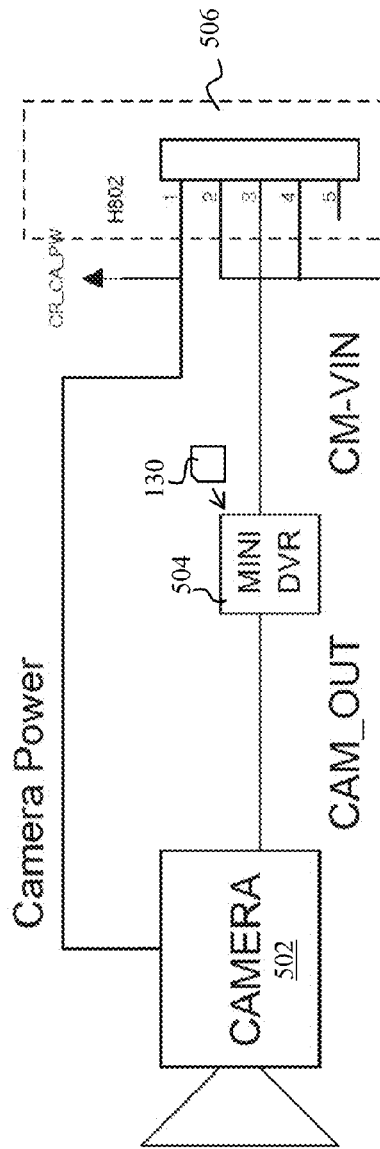
FIGS. 6A-1 to 6D are non-limiting, exemplary detailed illustrations of schematics of a video obstruction board illustrated in FIG. 2.
Figures 2, 4C:
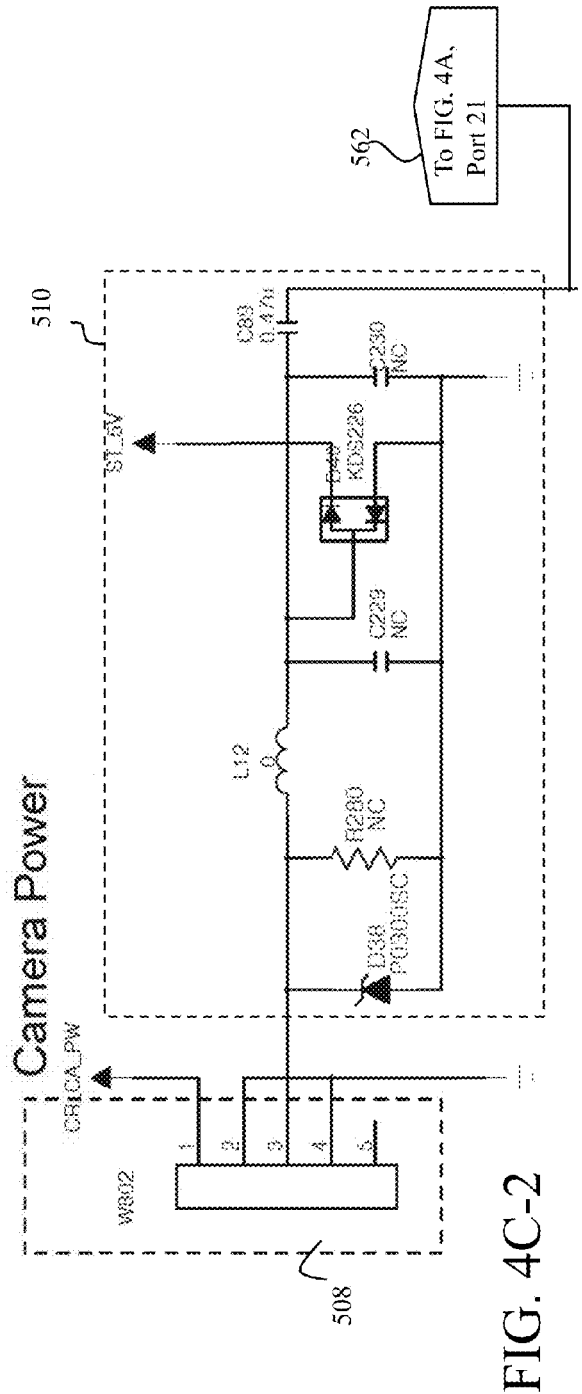
Figure 4D:
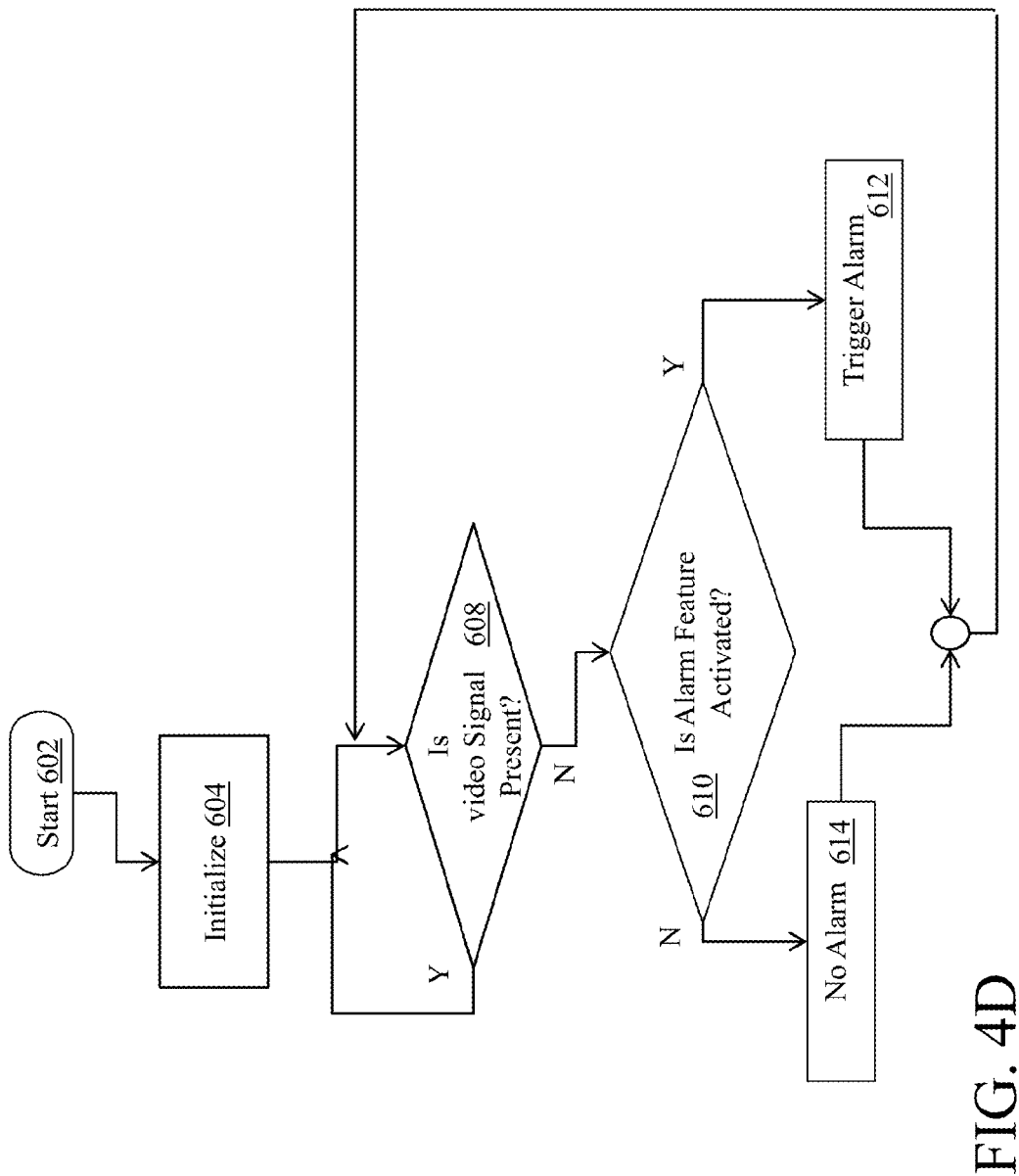

FIG. 4D is a non-limiting example of a processing flow for video signal loss detection. That is, the flow chart illustrates the MCU 540 operations of the video signal processing module 512 if a video signal is not received (or not present at input port 21) of the video signal processing module 512. Non-limiting examples of reasons for lack of a video signal may be due to camera malfunction 502, the media player malfunctions 504, disconnection of the connector sets 506 and 508, or others such as removal of a media from the one or more media players. Accordingly, the present invention provides processes that enable detection and trigger of an alarm due to a loss of video signal detected by the video signal processing module 512.

As illustrated in FIG. 4D, upon powering the public view monitor 100 to ON (operation 602), the video signal processing module 512, including all memory modules (for example, Random Access Memory or RAM, etc.) associated therewith is initialized at operation 604 and the video decoder 546 commences detection of presents or absence of video signals (at input port 21 of the video signal processing module 512 shown in FIG. 4A), the results of which are communicated with the MCU 540 of the video signal processing module 512. If no video signal is detected (at input port 21 of the video signal processing module 512) at operation 608, MCU 540 determines if an alarm feature for lack of video signal was set to be activate at operation 610 and if so, MCU 540 transmits an alarm voltage signal to trigger alarm (via output port 84, FIG. 4B) at operation 612, indicating a loss of video signal.

It should be noted that decision at operation 610 by MCU 540 of the video signal processing module 512 is based on the way the public view monitor 100 was setup by an authorized user. That is, as indicated above, the public view monitor includes the embedded tamper deterrent and security control modules that may be displayed in a non-limiting exemplary form of an on screen display menus that are used to set, control, and vary functions and features of the one or more tamper deterrent and security systems by an authorized user, including activation/deactivation of any selected one or more of the tamper deterrent and security systems. Accordingly, the public view monitor of the present invention provides the authorized user with the ability to disable or enable various alarm features associated with various tampering and security issues. Therefore, if the authorized user disables the alarm feature associated with video loss (for example, during the setup), then if a video loss does occur, the MCU 540 of the video signal processing module 512 will not trigger an alarm (operation 614) as the video loss alarm feature was disabled by the authorized user.

Figure 4E:
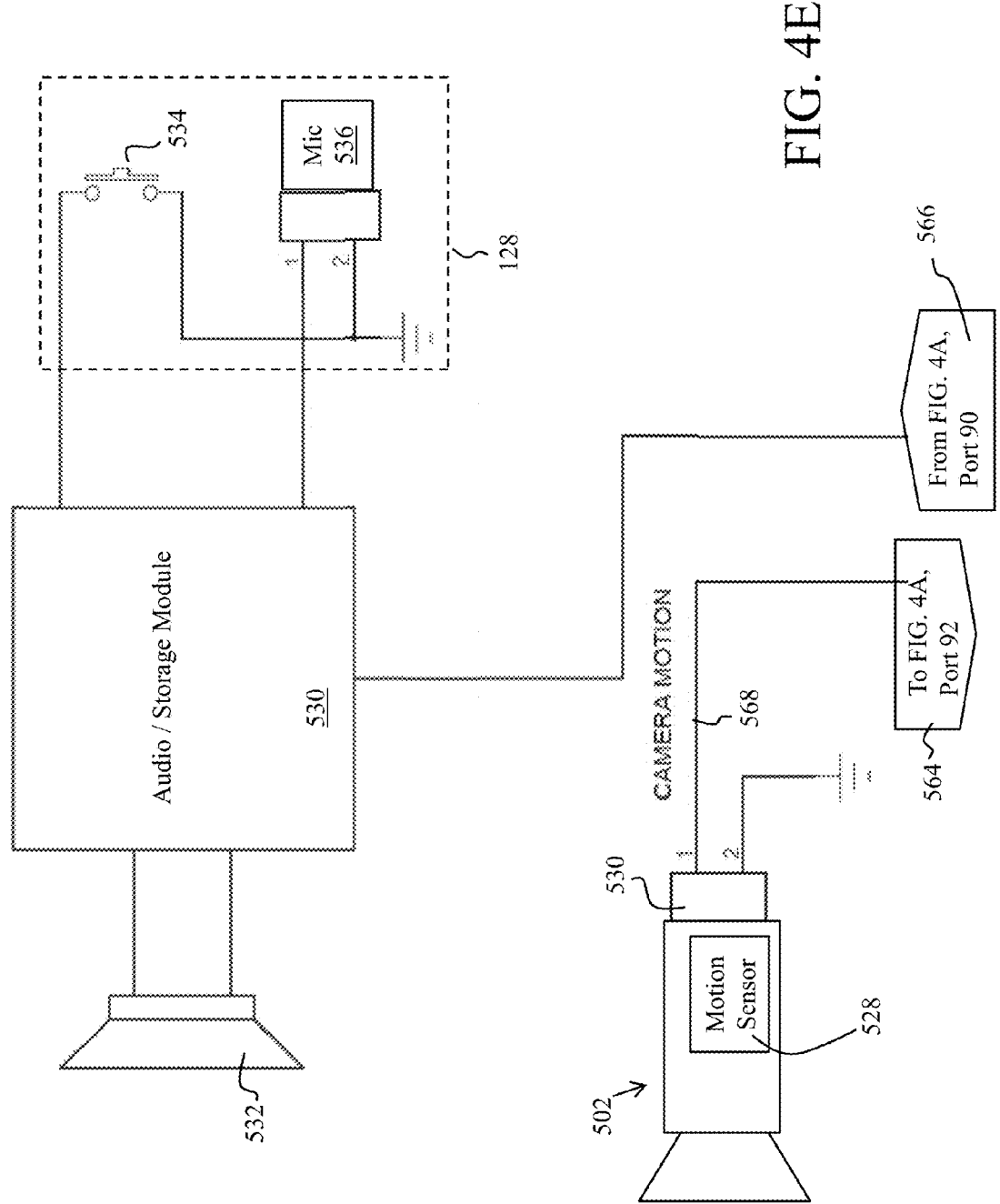

In addition to capturing video images and detecting video loss, as illustrated in FIG. 4E the embedded camera 502 further includes a well-known motion sensor 528 (e.g., manufactured by NEXTCHIP™ model NVP 2040) that senses motion in front of the camera 502. The motion sensor is connected with the video signal processing board 202 via a connector 530. The detected motion by the motion sensor 528 generates a motion sensing signal on the output line 568 connected to the off-page connector 564, which in turn, is communicated with an input port 92 of the video signal processing module 512 to enable the MCU 540 of the video signal processing module 512 to trigger another media player (e.g., an audio recorder 530 coupled with a speaker 532) via the output port 90 of the video signal processing module 512 (shown as the off-page connector 566).

The motion-based audible alert in accordance with the present invention is triggered when an individual walks in front of the motion sensor 528, which triggers an audible greeting (emanating from the audio-holes 124). The audible alert can be reconfigured to any message using the illustrated controls at 128 (the record switch 534 and microphone 536) illustrated in FIGS. 1D and 4E. In the back compartment 120 of the public view monitor 100 the user can press record switch 534 and speak to the microphone 536 to initiate the record process to create a greeting or any other audible content. Once the new audio content has been recorded (stored within the audio/storage module 530) it will only replay at the moment that motion is detected at the front of the public view monitor 100. This audio content may be configured to be turned OFF through a menu setting in the on screen display. The public view monitor 100 also includes a media player 302 (FIG. 3A) and associated removable media 132 that has an input and activation switch to enable recording of content for later playback (such as commercials), which may be triggered by the motion sensor 528.

Figure 4F:
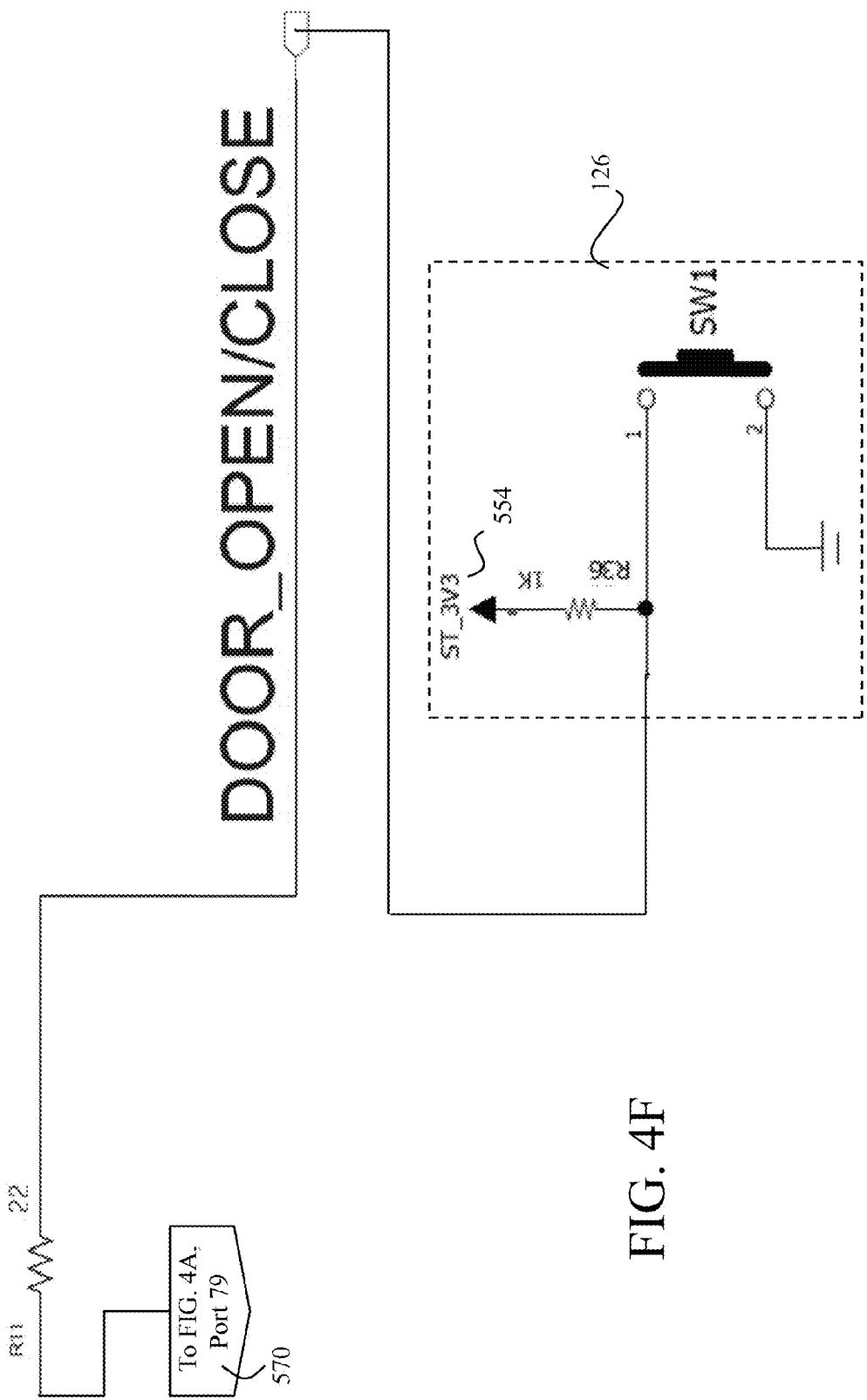

As part of the tamper deterrent and security systems, the public view monitor 100 further includes a sensor switch 126 (FIG. 1D) that indicates if a back door panel 118 (FIG. 1C) is open, preventing unauthorized access to compartment 120 and further, unauthorized removal of the one or more removable media. The sensor switch 126 (FIGS. 1D and 4F) is associated with a back door panel 118 (FIG. 1C) that when open (shown as SW1 in open condition as illustrated in FIG. 4F), creates an open circuit condition that generates a high signal at the input port 79 of the MCU 540 of the video signal processing module 512 (connection shown by the off-page connector 570 in FIG. 4F), which in turn, causes actuation and trigger of an alarm by the MCU 540. The high voltage signal is generated from the source 554 when the switch SW1 is open (indicating that the back panel door 118 is open). When the switch SW1 is open, the source 554 supplies power to the input port 79 rather than being short-circuited to the ground via a closed switch SW1. When SW1 is closed, the source 554 is short-circuited to ground and hence, the voltage at port 79 becomes low. The high signal received by the video signal processing module 512 (when SW1 is open and the voltage supplied from source 554 is supplied to input port 79 rather than short circuited via switch SW1) is interpreted by the MCU 540 as "door open" condition and hence, an alarm signal is generated at the output port 84 of the video signal processing module 512 to actuate the transducer module 524 (FIG. 4B) for generation of an audible alarm.

Figure 4G:
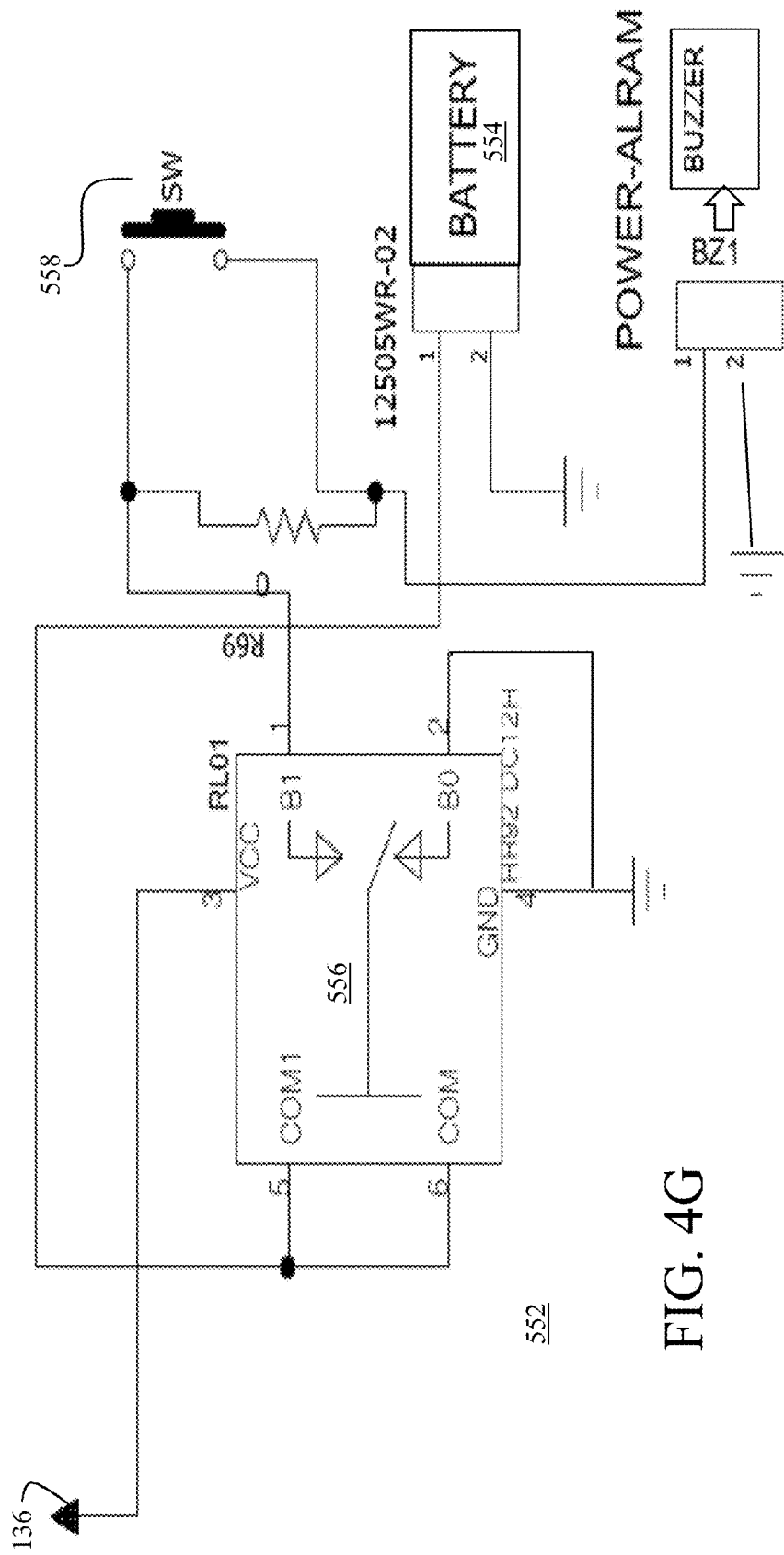

As part of the tamper deterrent and security systems, the public view monitor 100 further includes a power failure detection module 552, schematics of which are exemplarily illustrated in FIG. 4G. The power failure detection module 552 includes a switch 556 that is coupled with a main power source 136 and an auxiliary power source 554, and is biased (shown as connected with the contact or pole B0) to supply power via the main power source 136 during normal operation (while VCC of the relay 556 receives power), and is biased (connected to contact or pole B1) to supply power via the auxiliary power source 554 during failure of the main power source 136. The failure of the main power source 136 causes the switch 556 to trigger an alarm. Accordingly, if someone tampers with the power source (e.g., cuts the power line 136) the switch relay 556 switches to supply to auxiliary supply 554. The switch SW 558 (also illustrated in FIG. 1D) is used for deactivating the alarm when the SW 558 is closed. The SW 558 short-circuits the parallel-coupled resistor and hence, toggles OFF (stops) the alarm. It should be noted that trigger of an alarm as a result of power failure cannot be configured to be turned OFF or disabled through a menu setting in the on screen display when setting up the system. Alarm will sound continuously until the end user turns it OFF either through the switch SW 558 in the back compartment 120 or on the remote, or by supplying power right back to the monitor or until the battery eventually dies inside of the unit.

FIG. 4H is a non-limiting, exemplary illustration of schematic circuit showing cooperative relationship between a photo sensor and video processing signal board 202, to prevent false alarms. As illustrated, the public view monitor 100 includes a photosensor 516 for sensing ambient light (e.g., measuring ambient light intensity or brightness). The photosensor 516 is coupled with the input port 129 of the video signal processing module 512 through a connector 518. The photosensor 516 senses the ambient light intensity, and provides the sensed information in a form of a voltage signal (analog or digital) to the video signal processing module 512 for further processing. The MCU 540 within the video signal processing module 512 uses the information from the photosensor 516 (with the information from the video obstruction module 406) to prevent false alarms. For example (and as further detailed below in view of the video obstruction module 406 flow diagram (FIG. 7E, operation 656)), if the ambient light detected is low (an indication of nighttime), then it may be that the MCU 540 should not interpret the lack of light as "video obstruction" and hence, there may not be a need to trigger an alarm. Therefore (as further detailed below), using the information from the photosensor 516, the MCU 540 may trigger an alarm to ON if normal ambient lighting condition exists (ambient light detected is high) and video obstruction is detected. In general, the photosensor may comprise a photodiode light sensor such as a Cadmium Sulphide (CdS) photoresistor.

Figure 4I:
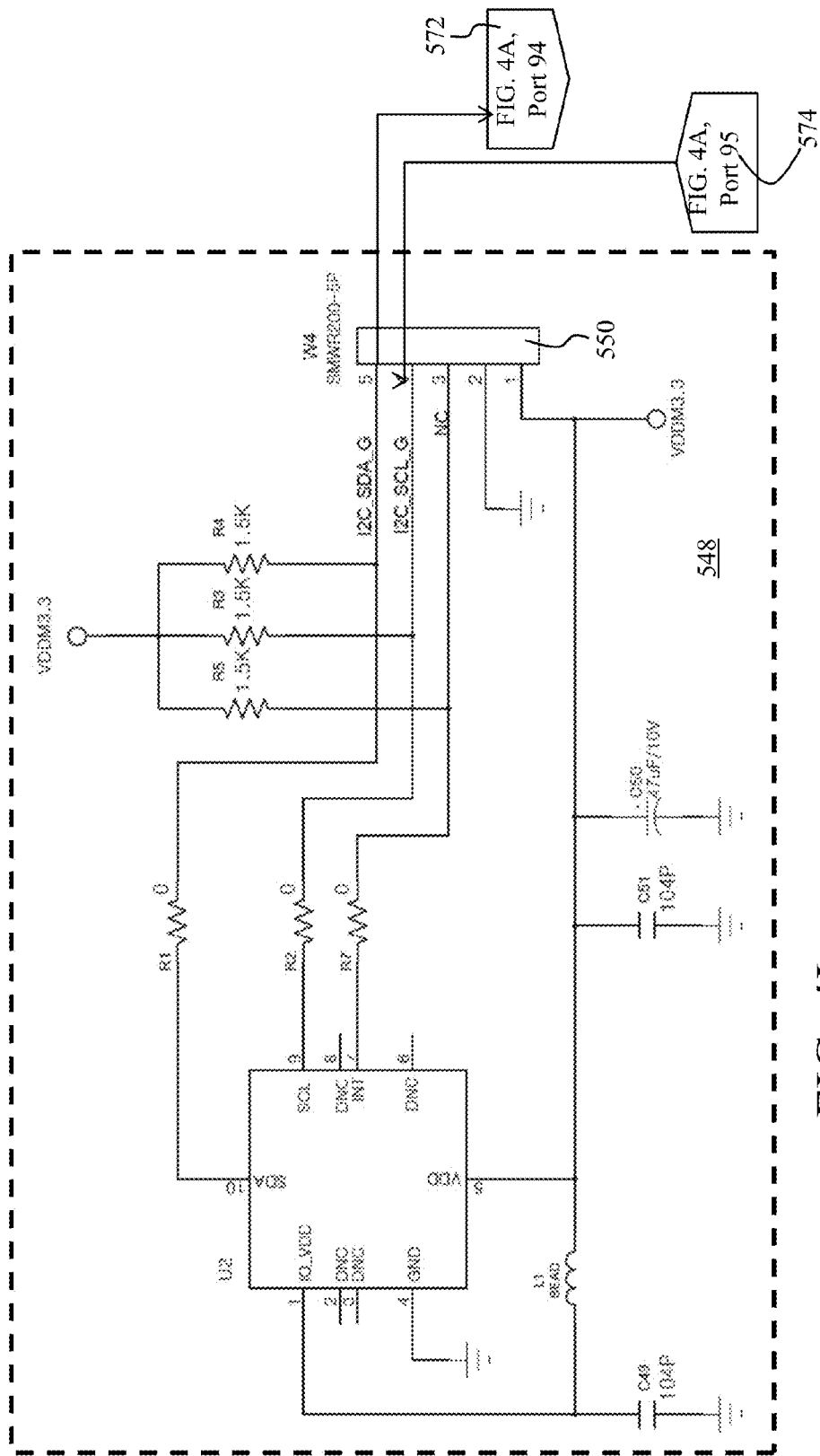

As part of the tamper deterrent and security systems, the public view monitor 100 further includes a sensor for detection of magnitude and direction of proper acceleration as a vector quantity to sense orientation, coordinate acceleration, vibration, falling, and shock. FIG. 4I is a non-limiting, exemplary illustration of a sensor for detection of orientation of the public view monitor in accordance with one or more embodiments of the present invention. In general, sensors for detection of magnitude and direction of proper acceleration as a vector quantity are known as G-sensors, which are very well known hardware components and have been used extensively in many applications and products. A non-limiting example of a G-sensor used may include chip model KXTI9 from KIONIX. The G-sensor 548 in FIG. 4I may comprise of single- and multi-axis accelerometer.

The sensor for detection of magnitude and direction of the public view monitor is used to deter individuals from trying to change the lens view orientation and direction (e.g., down or up or even sideways in either direction). Typically an individual may try to re-aim the direction of the monitor so that the camera view is not pointed in the intended point of view. At which time, if the monitor is moved from the set home or reference position, an alarm will be set off.

The present invention provides a G-sensor that is configured internally to the public view monitor (detailed below), which senses the move of the monitor unit. This alarm may be configured to be turned OFF through a menu setting in the on screen display. Alarm may be set to sound for a certain period once activated.

The video signal processing module 512 is coupled with the G-sensor 548 via a connector set 310 and 550, which facilitate an I/O serial data line (SDA) at I/O port 94 of the video signal processing module 512 (illustrated as off-page connector 572 in FIG. 4H) and clock signals at output port 95 of the video signal processing module 512 (illustrated as off-page connector 574 in FIG. 4I) via a serial clock signal line (SCL).

The cooperative relationship between the G-sensor 548 and the video signal processing module 512 in accordance with the present invention is detailed in FIGS. 5A to 5D. As illustrated in FIGS. 5A to 5D and further detailed below, the video signal processing module 512 receives orientation information from the G-sensor and determines the current orientation of the public view monitor 100 compared with a reference orientation, which is a previously determined orientation of the public view monitor 100, and determines if the current orientation is different from the previously set orientation (the reference orientation) and if so, the video signal processing module 512 triggers an alarm for a pre-determined period and resets the current orientation as a new reference orientation.

Figure 5A:
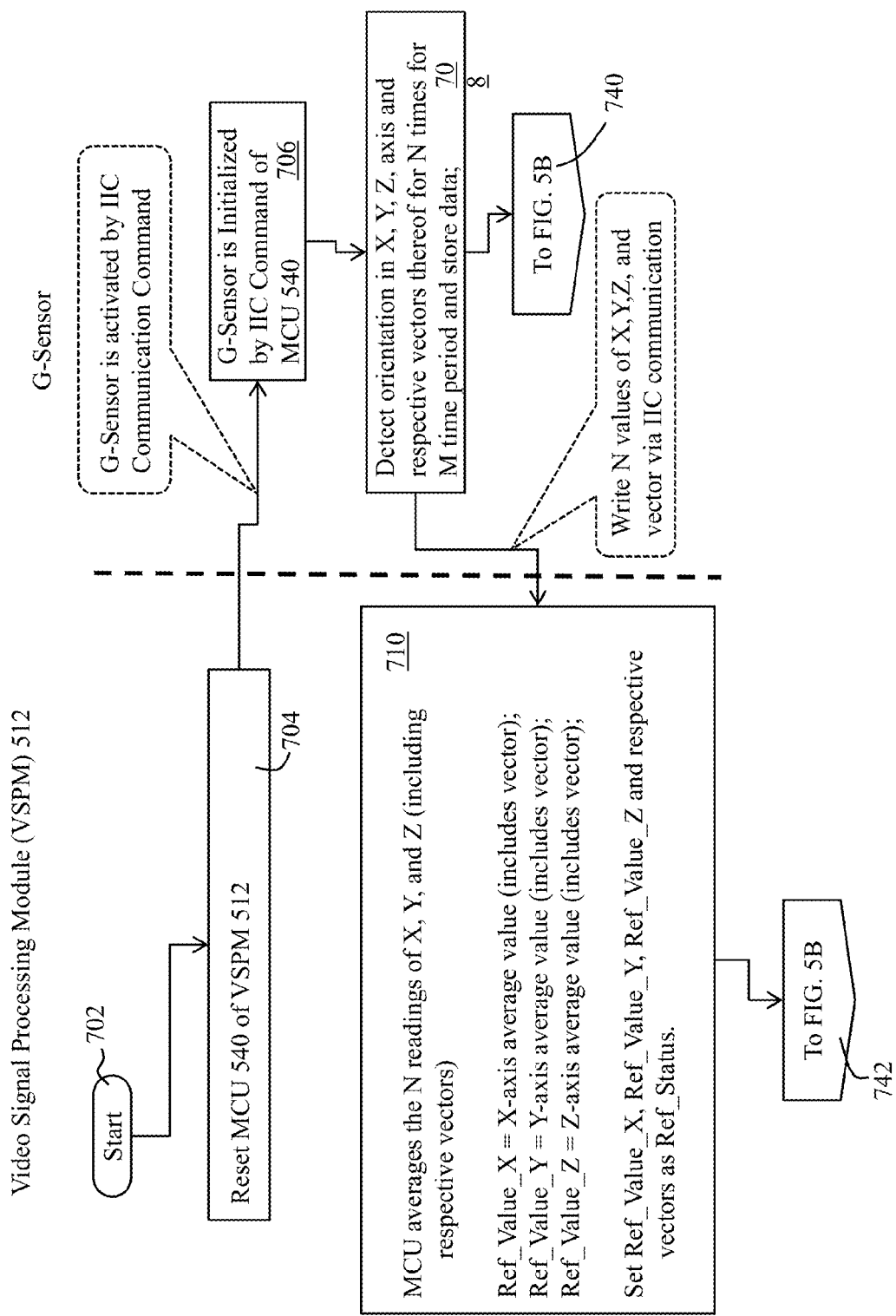
FIGS. 5A to 5D are non-limiting, exemplary flowcharts that represent a cooperative relationship between a sensor (illustrated in FIG. 4I) and a video signal processing module (illustrated in FIG. 4A) in accordance with one or more embodiments of the present invention.

In particular and as illustrated in FIG. 5A, the public view monitor 100 is powered to ON (at operation 702), and at operation 704, the MCU 540 of the video processing signal module 512 is reset, which, in turn, resets and initializes the G-sensor (at operation 706). The reset command is transmitted to the G-sensor via Inter-Integrated Circuit (IIC) communication protocol (the I/O serial data Line (SDA) of the connector 310 (of video signal processing module 512) and connector 550 of the G-sensor. The well known IIC communication protocol is implemented using clock signals for synchronizing communication of data between the registers of the video signal processing module 512 and the G-sensor 548. Further, the IIC communication protocol provides data signals for communicating actual data (e.g., read to or write from) between the registers of the video signal processing module 512 and the G-sensor 548, synchronized by the clock signals.

The clock signals are generated by the video signal processing module 512 at output port 95 (using Serial Clock Line (SCL)) and received by the input port 9 of the G-sensor 548, connected by respective connectors 308 and 550. The data signals are communicated between the video signal processing module 512 and the G-Sensor 548 through the respective I/O ports 94 and 10 (using Serial Data Line (SDA)) via connectors 308 and 550. The data signals may include initialization data wherein all registers of the G-sensor 548 are reset. It should be noted that the clock signals are based on the clock signals generated by the crystal oscillator 514. The clock signals also enable read-write of data on other ports of the G-sensor 548.

After initialization, at operation 708 the G-sensor 548 detects the magnitude and direction of the orientation of the public view monitor 100 along the X, Y, and Z axis N times for an M period of time and stores the information and further, transmits them to the MCU 540 of the video signal processing module 512 via the IIC communication. The next operation for the G-sensor 548 is indicated by the off-page connector 740 of FIG. 5A that is associated with the off-page connector 744 of FIG. 5B.

At operation 710 (FIG. 5A), the MCU 540 receives the N readings of the X, Y, Z and vector detections from the G-sensor 548, averages each, and stores each as the reference X, Y, and Z axis with their respective vector, and sets the detected orientation as the reference status of the public view monitor 100. The next operation for the MCU 540 of video signal processing module 512 is indicated by the off-page connector 742 of FIG. 5A that is associated with the off-page connector 746 of FIG. 5B.

Figure 5B:
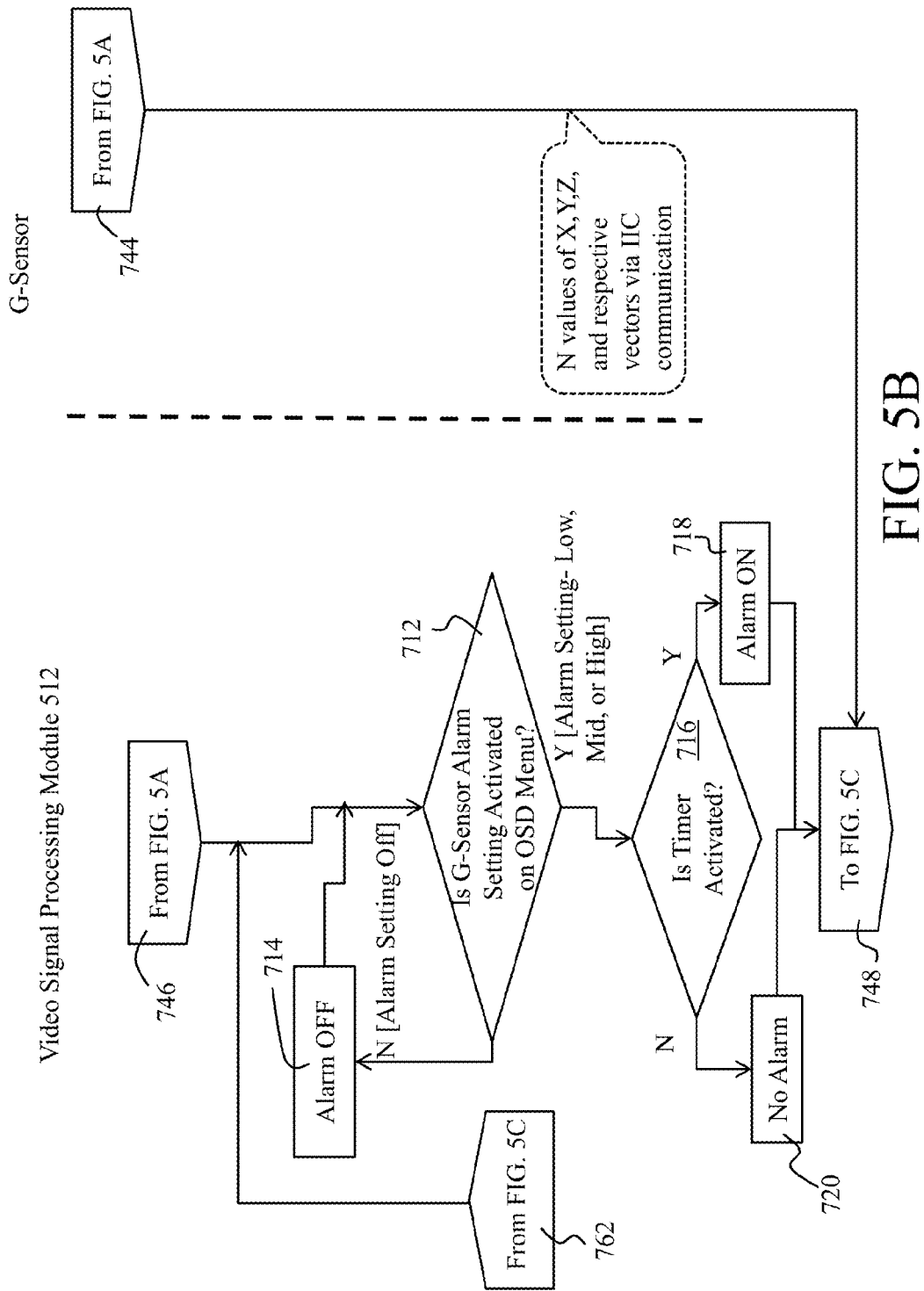

As illustrated in FIG. 5B, at operation 712 the MCU 540 determines if an orientation detection alarm was activated by user during setup via the on screen display menu and if no, the alarm will remain OFF (operation 714) regardless of any changes to the orientation of the public view monitor 100. If at operation 712 the MCU 540 determines that the orientation detection alarm is ON, at operation 716 the MCU 540 determines if an alarm timer has been activated and if so, the alarm is triggered at operation 718 otherwise, no alarm is triggered (operation 720). It should be noted that as indicated above, the present invention provides users to enable/disable any specific alarm and further, when the orientation detection alarm is set to ON (enabled), the on screen display menu provides users with settings to select the sensitivity level in terms of degree of change in orientation before an alarm is triggered. The remaining operation for both the G-sensor 548 and the MCU 540 of video signal processing module 512 are indicated by the off-page connector 748 of FIG. 5C that is associated with the off-page connector 750 of FIG. 5C.

Figure 5C:
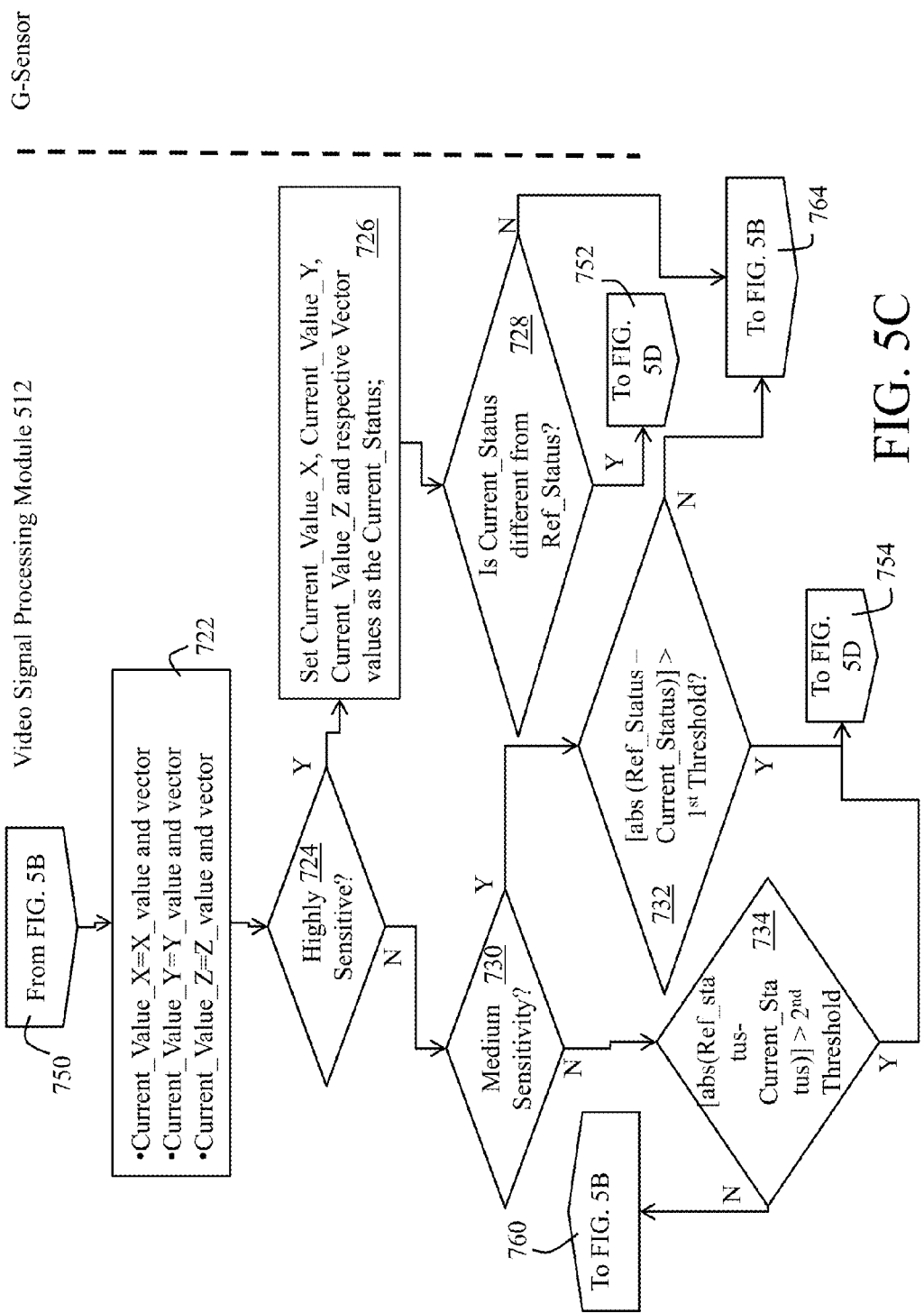
Figure 5D:
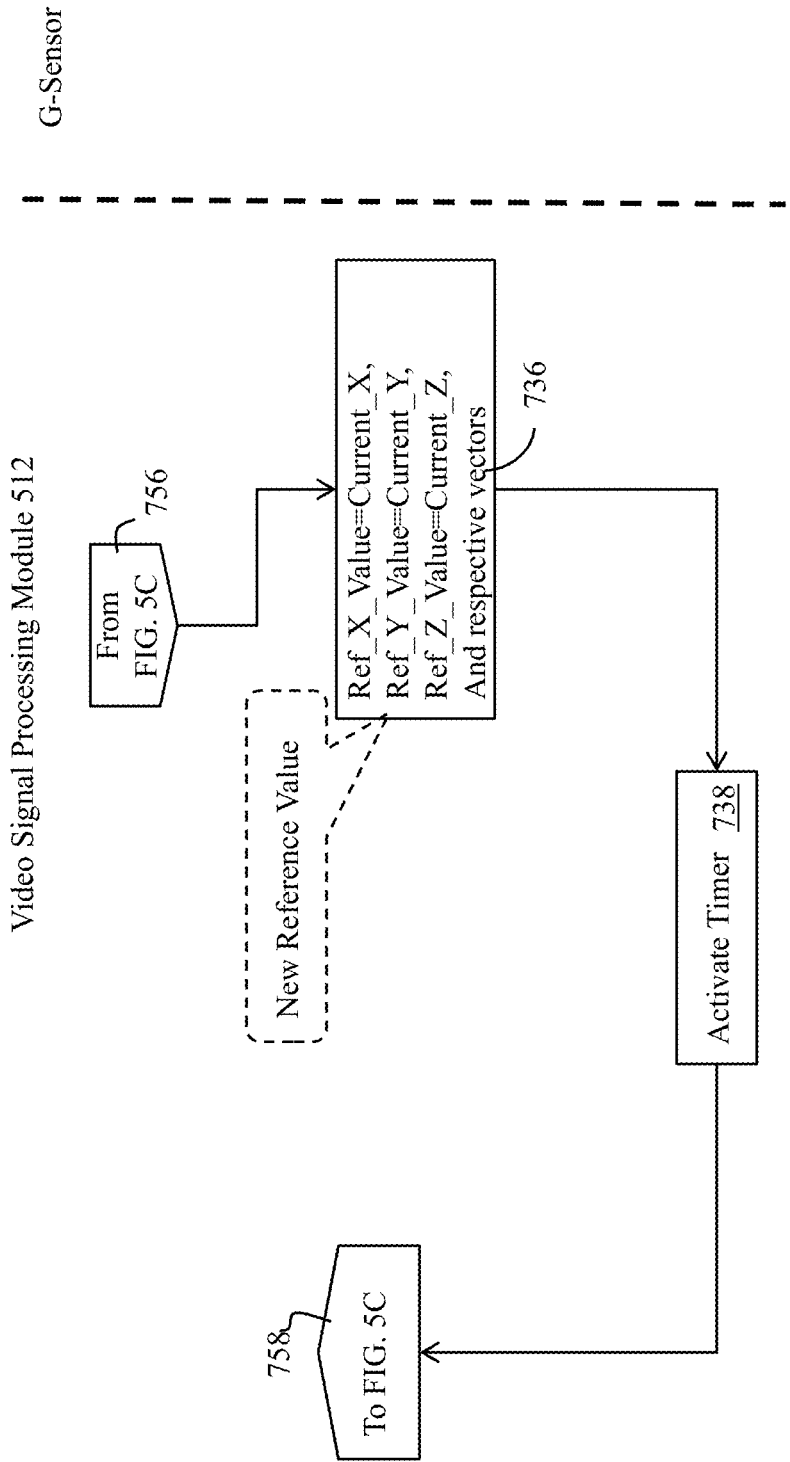

As illustrated in FIG. 5C, at operation 722, the MCU 540 reads the current orientation values in terms of X, Y, and Z axis and their respective vectors from the G-sensor 548, and depending on the sensitivity level in variation in orientation selected by an authorized users, one of the operations 724, 730, or 734 is selected. For highly sensitive (operation 724), the current values of X, Y, Z axis and their respective vectors are interpreted as the current orientation (current status) of the public view monitor at operation 726. At operation 728, the MCU 540 of the video signal processing module 512 determines if the reference and current statuses are different. If so, at operation 736 (FIG. 5D) the MCU 540 resets the reference status to the newly determined current status (the off-page connector 752 in FIG. 5C is associated with the off-page connector 756 in FIG. 5D). Further, at operation 738 (FIG. 5D) the MCU 540 activates a timer. The flow continues to operation 712 in FIG. 5B via respective off-page connectors 758 (FIG. 5D), 760 (FIG. 5C), and 762 (FIG. 5B). If at operation 728 it is determined that no movement of the monitor is detected, then the flow continues to operation 712 in FIG. 7B via the respective off-page connectors 764 (FIG. 5C) and 762 (FIG. 5B). For example, if the public view monitor 100 was moved from its original orientation (reference status) to the new orientation (current status), any change in the orientation (highly sensitive setting) may trigger an alarm for a predetermined duration (commenced by the operation 738 and eventually terminated by the operation 716). Further, the new (or current) position of the public view monitor 100 is set to become the reference position (reference status) at operation 736 so that in the subsequent executions of the operation 728, the current and the reference statues would be the same and hence, no alarm is triggered.

If a medium level of sensitivity is selected by an authorized user via the on screen display menu during the setup of the public view monitor 100, then the operation 730 is performed, which leads to operation 732, wherein the absolute value of the difference between the current status (or orientation) and the reference status (from operation 710) is determined and compared to a first threshold level. If the MCU 540 determines that the absolute value difference exceeds the first threshold level at operation 732, then (as indicated by the off-page connector 754) operations 736 and 738 in FIG. 5D (via the associated off-page connector 756) are executed in the same manner as described.

If the sensitively level selected is not high or medium, then MCU 540 at operation 734 determines if the absolute value of the differences between the reference status and the current status for the orientation of the public view monitor is greater than a second threshold (which may be set to be higher than the first threshold). If so, the MCU 540 executes operations 736 and 738 as described above. If the change in movement of the monitor is below the second threshold level, then the operation 712 is performed as indicated by the off-page connector 760.

Figures 1, 6A:
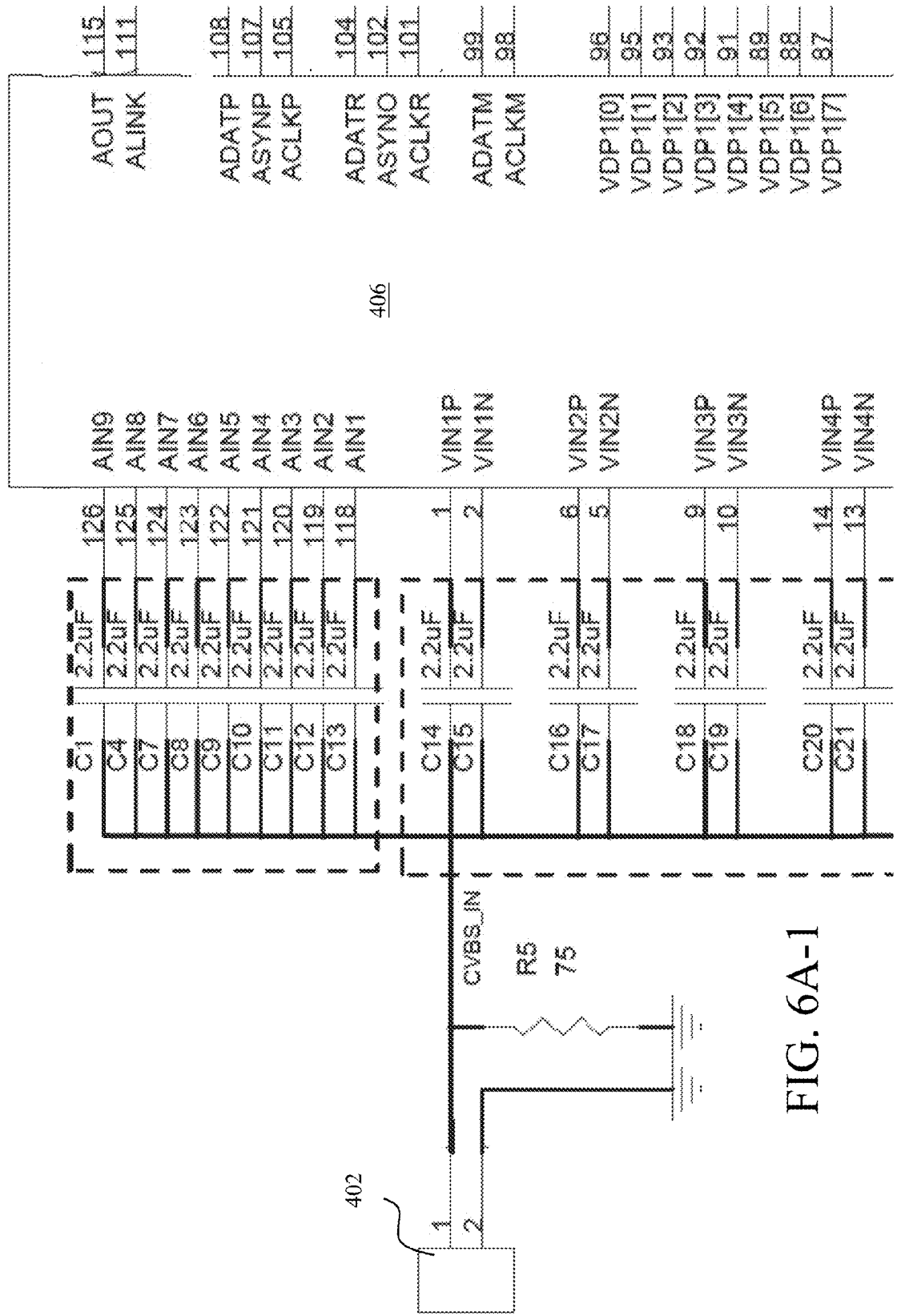
Figures 2, 6A:
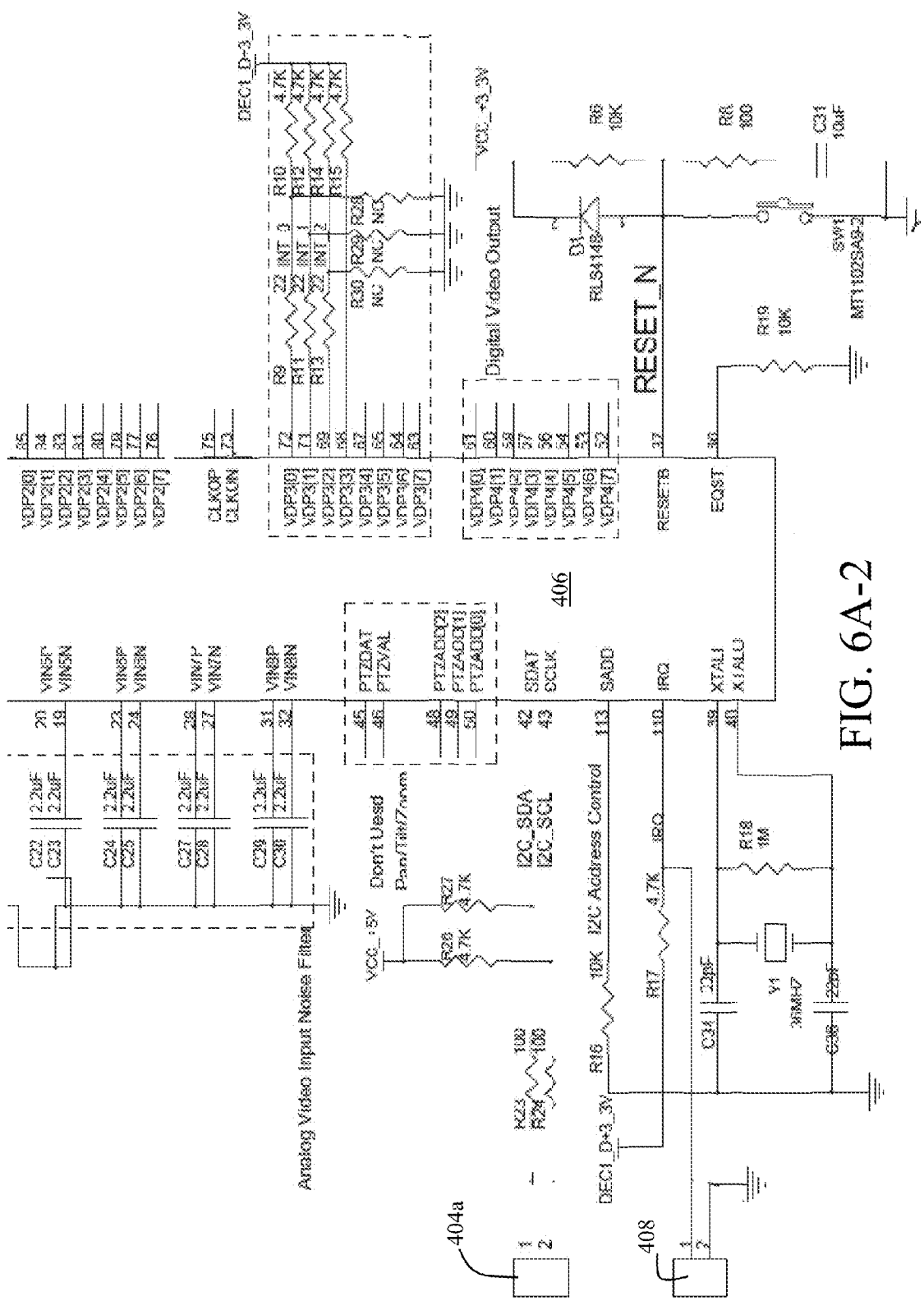
Figure 6B:
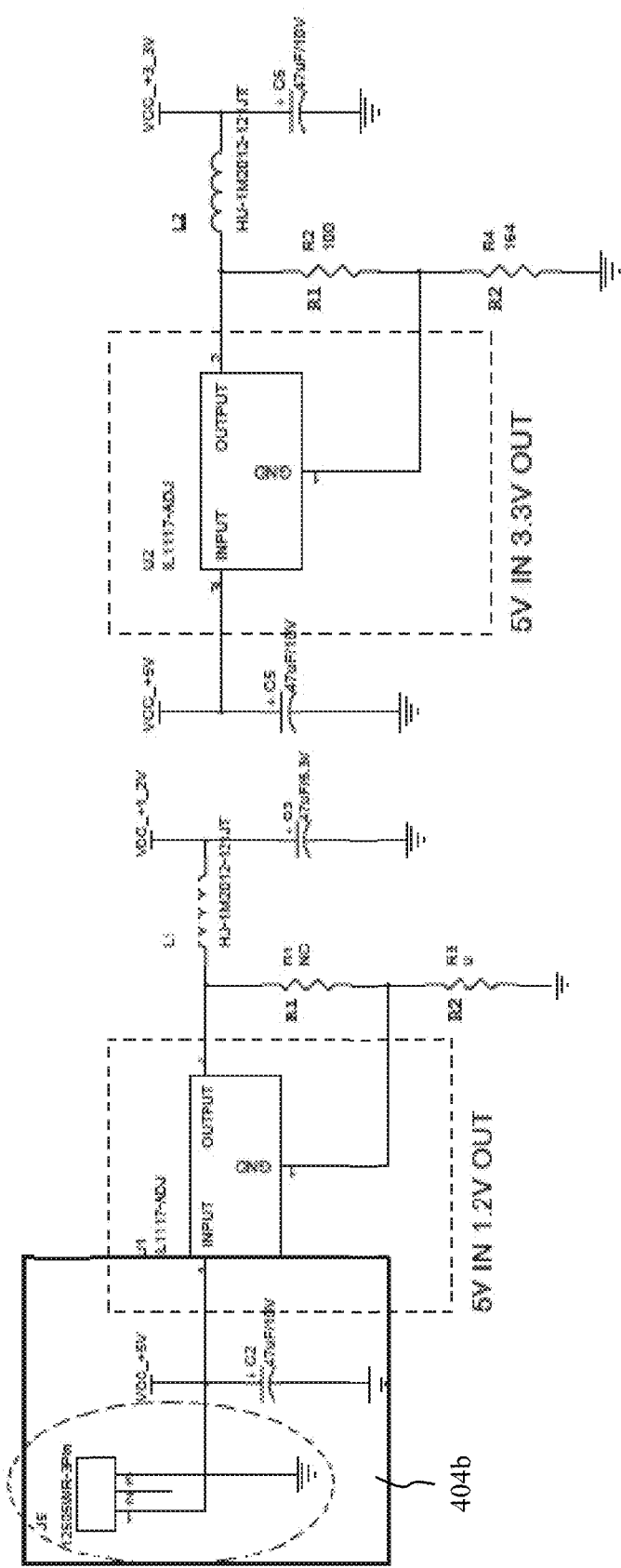
Figures 6C, 6D:
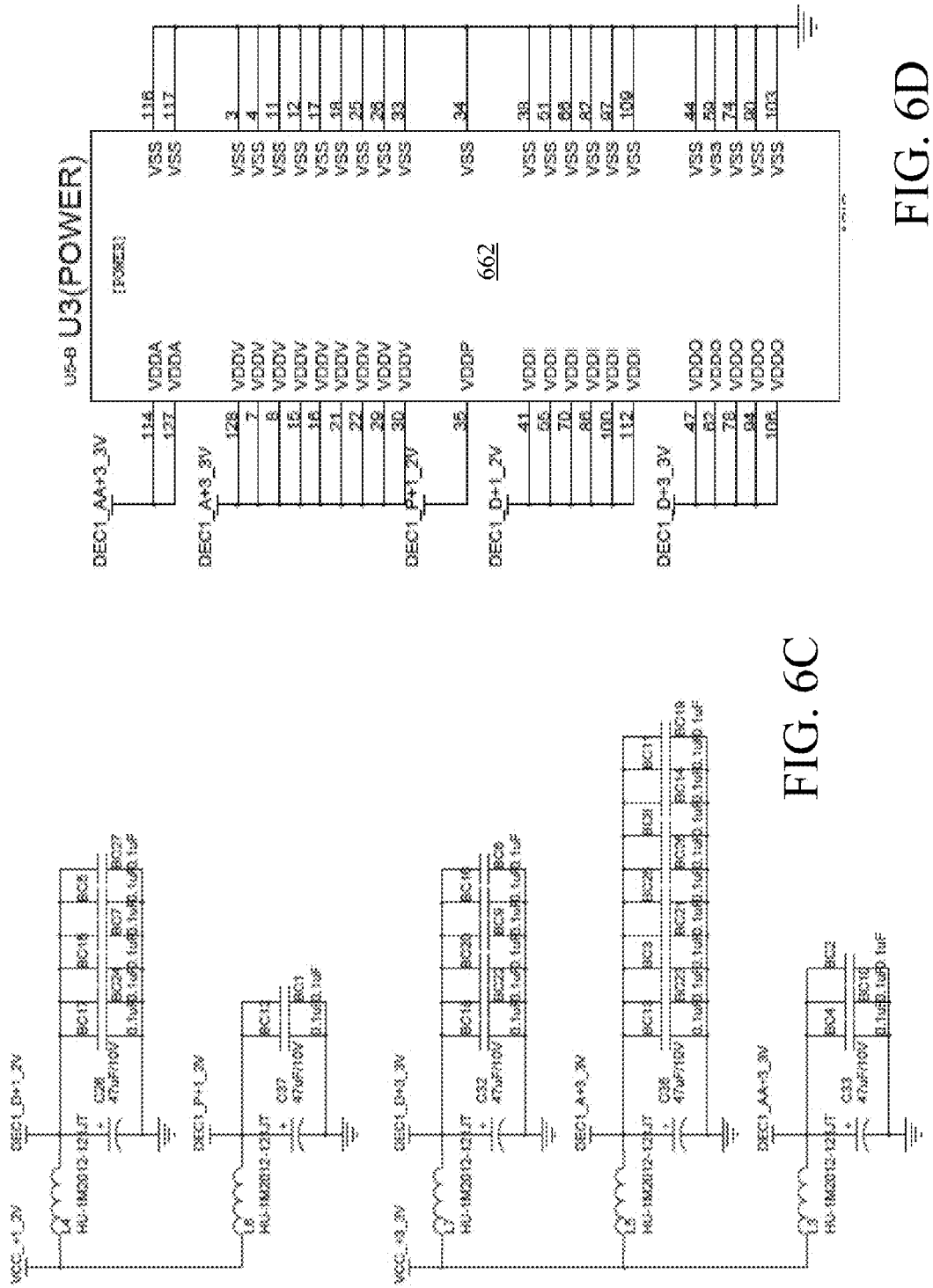

As part of the tamper deterrent and security systems, the public view monitor 100 further includes video obstruction detection, which detects if the view of the lens of the camera 502 is tampered by obstruction. FIGS. 6A-1 to 6D are non-limiting exemplary illustrations of the schematics of the video obstruction board, and FIGS. 7A to 7E are functional flow diagrams that detail the cooperative working relationship between the video obstruction board 204 and the video signal processing board 202. FIG. 6E is a non-limiting exemplary illustration of the schematics of a photo-sensor in relation to the video signal processing module 512, which is detailed below in relation to the flows illustrated in FIGS. 7A to 7E.

As indicated above, obstruction is detected using the video obstruction board 202, which includes the video obstruction module 406 (FIGS. 6A-1 to 6B) for processing video signals communicated from the video signal processing module 512 to determine obstruction of camera 502 in addition to processing video obstruction board power systems (FIGS. 6C to 6D). The processed digital video signal from the video signal processing module 512 is output to the video obstruction module 406 of the video obstruction board 204 via a Composite Video Baseband Signal Output Port 23 of the video signal processing module 512 connected through a connector set 304 (FIG. 3A) and 402 (FIG. 6A-1). It should be noted that video obstruction module 406 is an analog and sensor integrated circuit, which is well known and readily available from IDENCORE™ model IDENCORE 1100. The details of the circuit schematics of the power system for the video obstruction board 204 illustrated in FIGS. 6C and 6D are well known and include a well known power chip 662 (FIG. 6D) and a well known power filtering system (FIG. 6C) to provide clean power to the video obstruction board 204. A non-limiting example of a power chip 662 is readily available and manufactured by IDENCORE™ model IDENCORE 1100.

In addition to CVBS video signal communication between video signal processing module 512 and the video obstruction module, the video obstruction module 406 of the video obstruction board 204 communicates with the video signal processing module 512 of the video signal processing board 202 via an Inter-Integrated Circuit (or IIC) communication protocol. The IIC communication protocol is implemented using clock signals for synchronizing communication of data between the registers of the video signal processing module 512 and the video obstruction module 406. Further, the IIC communication protocol provides data signals for communicating actual data (e.g., read to or write from) between the registers of the video signal processing module 512 and the video obstruction module 406, synchronized by the clock signals.

The clock signals are generated by the video signal processing module 512 at output port 82 (using Serial Clock Line (SCL)) and received by the input port 43 of the video obstruction module 406, connected by respective connectors 306 and 404a. The data signals are communicated between the video signal processing module 512 and the video obstruction module 406 through the respective I/O ports 83 and 42 (using Serial Data Line (SDA)) via connectors 306 and 404a. The data signals may include initialization data wherein all registers of the video obstruction module 406 are reset. It should be noted that the clock signals are based on the clock signals generated by the crystal oscillator 514. The clock signals also enable read-write of data on other ports of the video obstruction module 406, such as the input port 1. The remaining ports of the connector 306 are coupled to power and ground, with the connector 404b (FIG. 4B) coupled to a well known power regulator on the video obstruction board 204.

As indicated above, FIGS. 7A to 7E are flow diagrams that detail the cooperative working relationship between the video obstruction board 204 and the video signal processing board 202. Video obstruction board 204 causes to generate a video obstruction alarm in accordance with the present invention to deter obstruction of the camera view. Obstruction of the camera view can be done any number of ways such as an individual placing their hand or an object in front of the camera view (best illustrated in FIG. 1E). Video obstruction alarm in accordance with the present invention may emit an audible alarm when obstruction is sensed. As detailed below, the video obstruction alarm has the ability to be manually configured for different sensitivities. In order to turn video obstruction alarm OFF it can be done by a number of ways such as:

Manually, through an ON and OFF switch (SW 558) on the back of the unit

By remote control and selecting to disarm the video obstruction alarm through an embedded Graphic User Interface (GUI)—the on screen display menu By schedule configuration where the video obstruction alarm can be configured to turn ON Video obstruction configuration can be manually configured to alarm for indeterminate amount of time set by the user. When the alarm is set, the public view monitor may display a text overlay (FIG. 1E) that will alert on the on screen display to reference the act of tampering (e.g., "security alert!"). This alarm may be configured to be turned OFF through a menu setting in the on screen display. Alarm may sound for a certain period once activated unless configured in a different time recurrence.

As illustrated in FIGS. 7A to 7E, in general, the video obstruction module 406 receives CVBS video signals from the video signal processing module 512 and if video obstruction is detected, transmits an obstruction signal (via port 110 of the connector 408 of the video obstruction module 406) to the (input port 69 of the connector 308) of the video signal processing module 512 based on processing of the video signal.

Figure 7A:
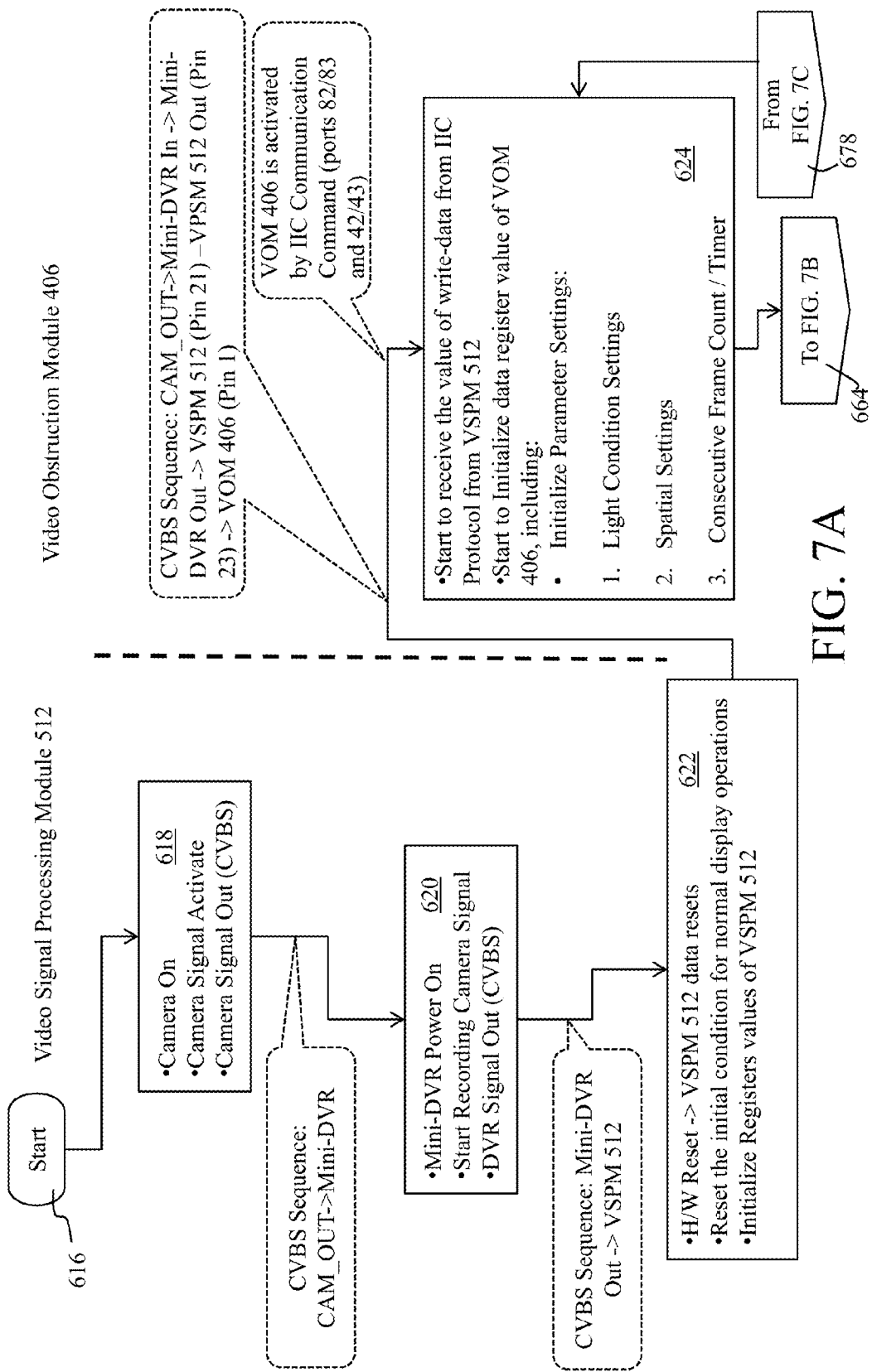

More specifically as illustrated in FIG. 7A, at operation 616, when the public view monitor 100 is powered ON, all systems are power to ON and initialized. In particular, at operation 618, the camera 502 is powered ON, camera video signal (Composite Video Baseline Signal or CVBS) is activated, and the video signal (CVBS) is output from camera 502 to the media player (e.g., the mini-DVR 504). That is, Composite Video Baseline signals sequence from the camera 502 is provided to the now powered ON mini-DVR 504, which (as indicated in the operation 620) commences recording of the CVBS sequence, and generates a Digital Video Recorder (DVR) signal output (which is the stored CVBS sequence captured by the camera 502, stored within a removable media 130). In other words, at operation 620, the min-DVR 504 commences recording the incoming CVBS sequence from the camera 502, and generates an output video signal (CVBS).

As indicated above and further illustrated in the operation 622, when the public view monitor 100 is powered ON, all hardware and registers are reset to normal operation, with the reset signal forwarded to the video obstruction module 406 (operation 624). That is, the video signal processing module 512 forwards a reset command via its IIC connection with the video obstruction module 406 to reset the video obstruction module 406 and further, transmits the DVR signal (CVBS sequence) to the video obstruction module 406 via connector sets 304 and 402. In other words, the composite video baseband signal (CVBS) from output port 23 of video signal processing module 512 is connected to input port 1 of video obstruction module 406 via the connector set 304 (FIG. 3A) and 402 (FIG. 4A-1). In particular and as illustrated, operation 624 resets the video obstruction module 406 by initializing various parameters based on the activation command received via IIC connection, non-limiting examples of which may include the light condition settings, spatial settings, consecutive frame count/timer settings, etc.

The video obstruction module 406 continuously receives consecutive composite video baseline signal frames in sequence at a rate of about 60 (or more precise 59.97) CVBS frames per second. The video obstruction module 406 compares a frame and a next, consecutive frame sequence for differences in a variety of parameters related to video signals such as light conditions (e.g., luminance, chroma, etc.) and noise, evaluating 60 consecutive frames per second of time for a specified number of consecutive frame sequences (or duration of time) to determine if criteria for existence of obstruction is met.

Figure 7B:
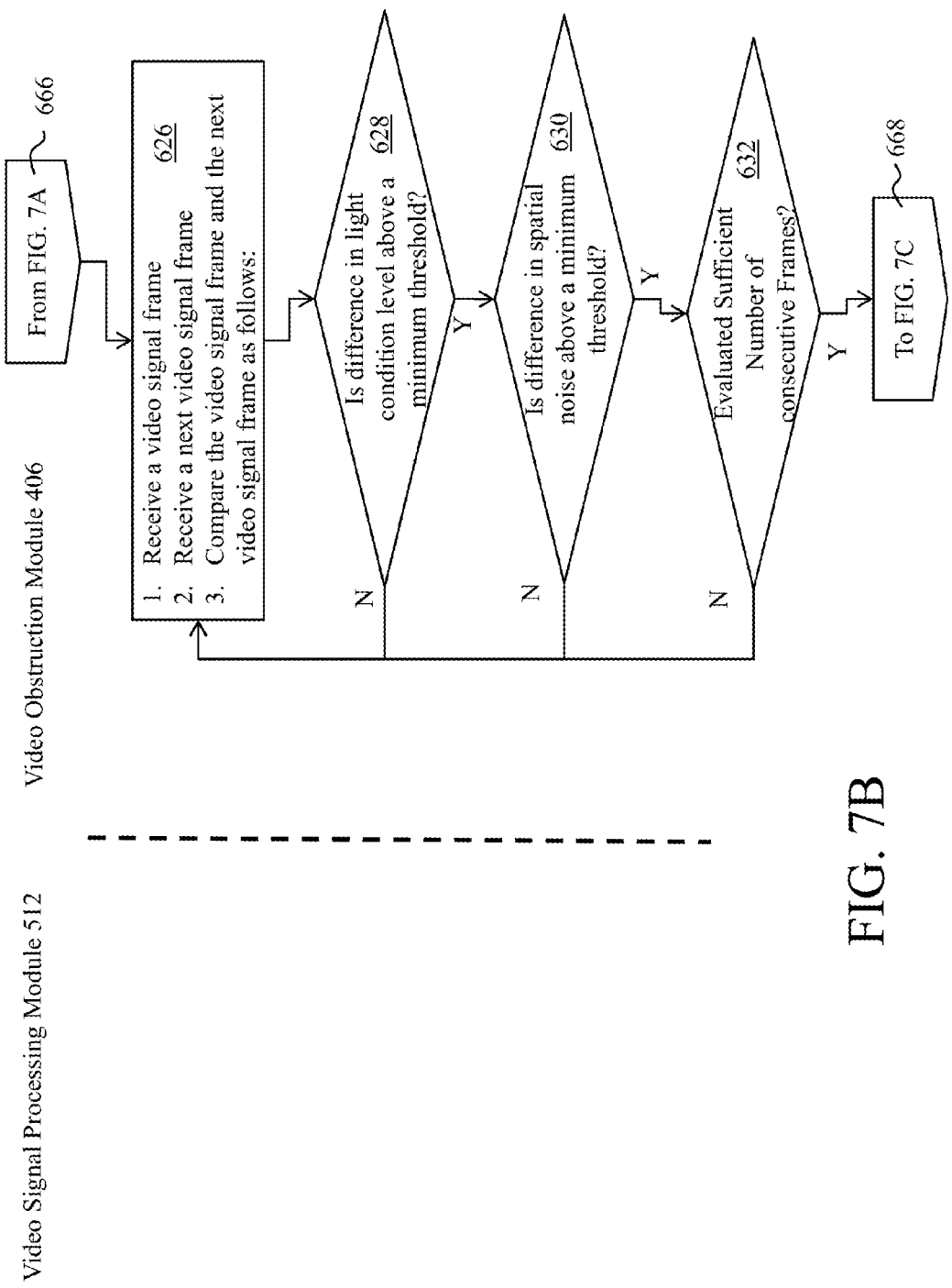

As illustrated in FIG. 7B, at operation 626 (wherein the off-page connector 664 in FIG. 7A is associated with the off-page connector 666 in FIG. 7B) the video obstruction module 406 receives a frame and a next, subsequent frame for comparing the video signal conditions of the two frames to determine if criteria for existence of obstruction is met. At operation 628, the video obstruction module 406 evaluates the differences in the light condition (e.g., luminance, Chroma, etc.) level between the received frame and the next, subsequent frame, and determines if the differences are above a predetermined a minimum threshold level. If so, the same set of frames are then evaluated at the operation 630 for spatial noise. Otherwise, the flow returns to operation 626 where another set of frame sequence received are analyzed for light conditions.

It should be noted that evaluating differences in frame light conditions (e.g., luminance, chroma, etc.) of video frames is very well known and may be accomplished by a variety of different ways, a non-limiting example of which may include comparing corresponding regions within neighboring pixels of the frame and the next subsequent frame to determine differences in light conditions. It should further be noted that although the difference in light condition between the frame and the next, subsequent frame may exceed the predetermined minimum threshold, that difference may be due to small level of noise (also known as "white noise") within the CVBS frame signals rather than an actual obstruction of the camera 502. Accordingly, in addition to the determining lighting condition, the present invention also evaluates differences in noise levels between a frame and a next, subsequent frame to prevent false trigger of an alarm. That is, at operation 630, the present invention evaluates the differences in the spatial noise level between the received frame and next, subsequent frame, and determines if the differences are above predetermined a minimum threshold level.

As with determining light conditions, evaluation of noise in signals (video or others) at operation 630 is very well known and may be accomplished by a variety of different ways, a non-limiting example of which may include comparing noise levels of corresponding regions within neighboring pixels of the frame and the next subsequent frame. For example, if the camera 502 of the public view monitor 100 is blocked or obstructed in a next, subsequent frame, the preceding frame would have minimal noise within the pixels of the frame while the subsequent frame (the frame that captured the obstruction) would have a much larger number of "noise pixels" within the same comparable regions, covering a large portion (or span) of the picture frame. The "noise pixels" refer to the resulting parameters for pixels in an image when the camera 502 is physically obstructed. According, if the differences in the spatial noise level (the number of "noise pixels" in a frame) between the received frame and next, subsequent frame is above predetermined minimum threshold level for a predetermine number of pixels, then a second criteria for determining existence of obstruction is met. Otherwise, flow continues with the operation 626 as described above.

Figure 7C:
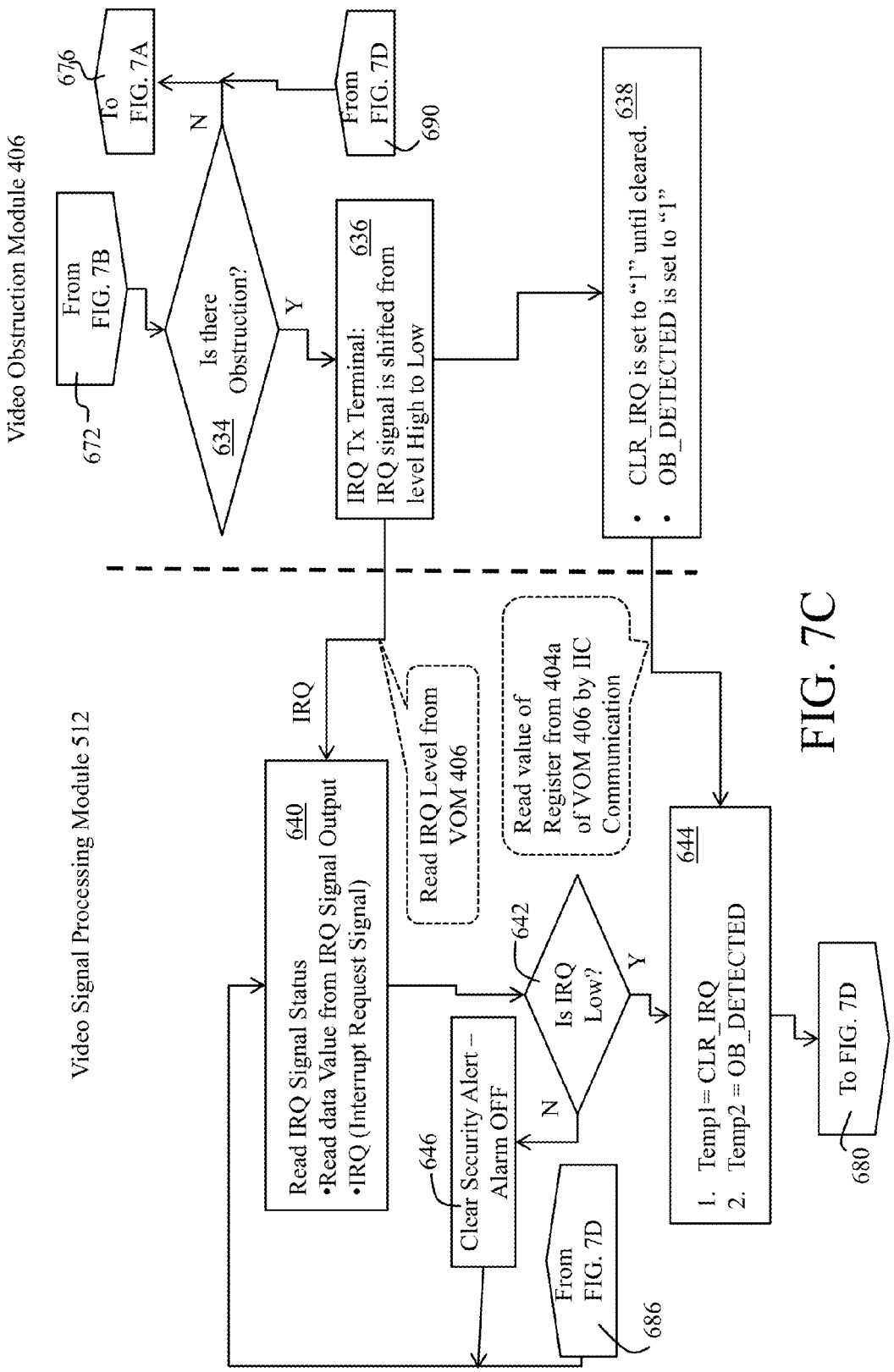
Figure 7E:
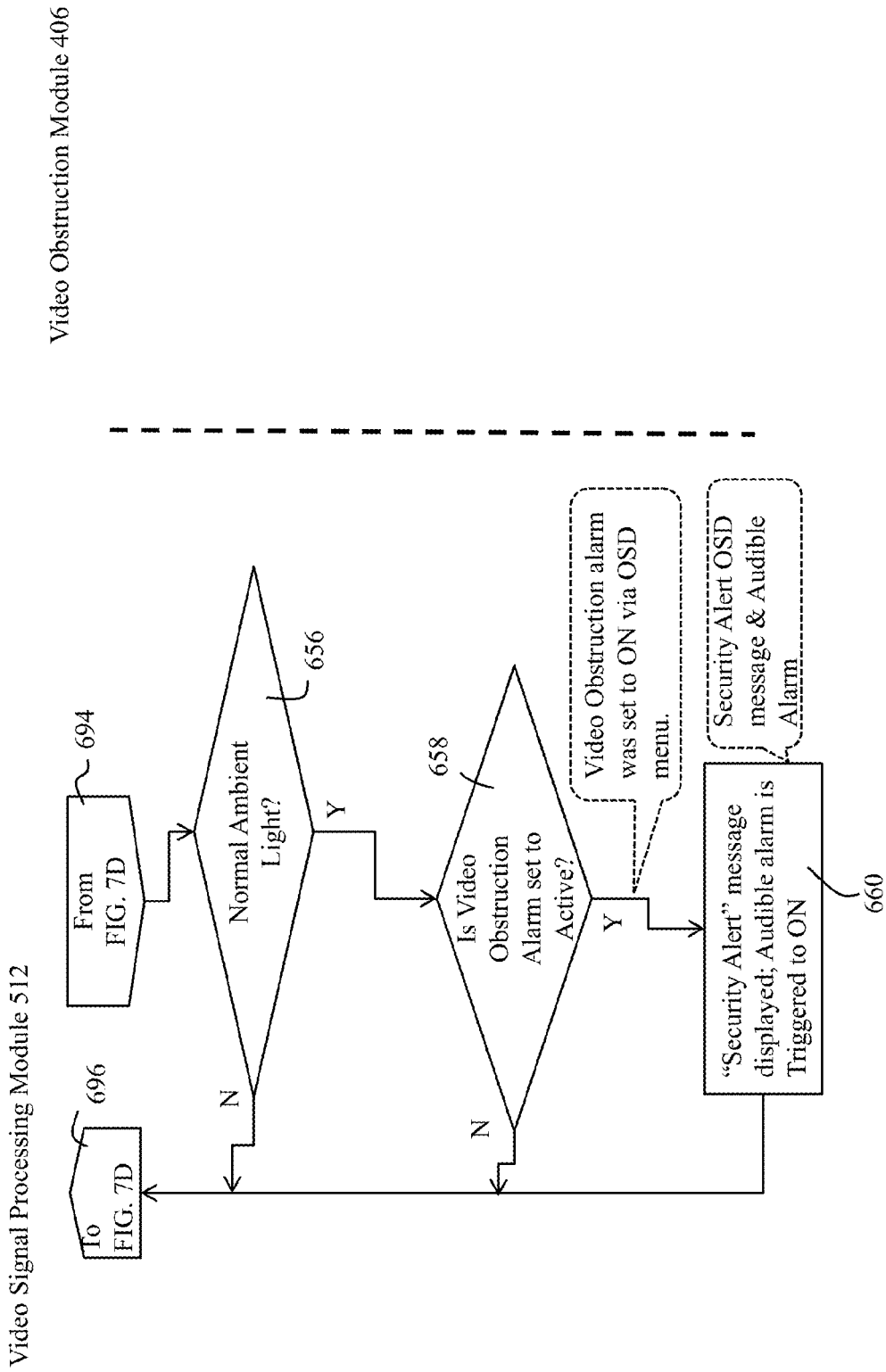

Of course, large differences in light conditions (at operation 628) and spatial noise (at operation 630) between a frame and a next, subsequent frame, may be temporary and unintentional. That is, the supposed (or so called) "obstruction" conditions at operations 628 and 630 may have been triggered (for example) due to an individual standing too close to the camera 502 of the public view monitor 100 for only a short duration (e.g., a few seconds), obstructing the view of the camera 502. Of course, triggering an alarm for such a temporary, unintentional obstruction would be a false alarm. Accordingly, in addition to determining lighting condition and noise levels, the present invention at operation 632 also evaluates the duration (e.g., time and or number of consecutive frames evaluated) of the obstruction to prevent false trigger of an alarm. That is, at operation 632, the present invention additionally evaluates the duration of the "obstruction" and determines if the duration is above a predetermined minimum threshold level and if so, possibility of obstruction may exist in which case, operations illustrated in FIG. 7C are performed. (The off-page connector 668 in FIG. 7B is associated with the off-page connector 672 in FIG. 7C).

As illustrated in FIG. 7C, if video obstruction module 406 determines at operation 634 that criteria for existence of obstruction is met, the video obstruction module 406 at operation 636 transmits an interrupt request signal (IRQ) to the video signal processing module 512 to commence further evaluations for obstructions and possible or potential actuation and trigger of an alarm. If at operation 634 it is determined that there is no obstruction, then the video obstruction module 406 is reset as apparent from the off-page connector 676 in FIG. 7C associated with the off-page connector 678 in FIG. 7A.

It should be noted that while transmitting the IRQ signal via connector sets 408 (output port 110 of video obstruction module 406, shown in FIG. 6A-2) and 308 (input port 69 of the video signal processing module 512 in FIG. 4A), the following registers within the video obstruction module 406 are also set at the operation 638:

CLR_IRQ register is set to 1 to indicate that an interrupt signal has already be transmitted to the video signal processing module 512, and OB_DETECTED register is set to 1 to indicate the detection of obstruction by the video obstruction module 406.

As further indicated in FIG. 7C, at operation 638, the set values of the registers CLR_IRQ and the OB_DETECTED are transmitted to the video signal processing module 512 via the IIC communications (via connector 404a of video obstruction module 406 and the connect 306 of the video signal processing module 512 (the SDA I/O line 42/83)). As further detailed below, at operation 644, the set values are read and stored within the memory of the video signal processing module 512 within memory registers Temp1 and Temp2. It should be noted that the scheme may be varied where the values for the registers are set to low (or "0") rather than the illustrated and described high "1" value.

The MCU 540 of the video signal processing module 512 receiving the IRQ at operation 640 determines whether the IRQ is low (at the operation 642), wherein at the next operation 644, the register values are saved as indicated above. At operation 646 (illustrated in FIG. 7D and reached via the off-page connector 680 in FIG. 7C associated with the off-page connector 682 in FIG. 7D), the MCU 540 of the video signal processing module 512 reads the values of the CLR_IRQ from the Temp1 memory and determines if Temp1 (which has a copy of the value of CLR_IRQ) is set to "1." If not, MCU 540 of the video signal processing module 512 continues to read IRQ signals from the video obstruction module 406 at operation 640 (the flow continuation of which are illustrated by the off-page connector 684 in FIG. 7D associated with the off-page connector 686 in FIG. 7C).

If at operation 646 the MCU 540 determines that the Temp1 is set to "1," at operation 648 the MCU 540 of the video signal processing module 512 resets the value of CLR_IRQ register of video obstruction module 406 to "0" by writing this zero value into the CLR_IRQ register of the video obstruction module 406 using the IIC communication (via connector 306 of the video signal processing module 512 to the connector 404a of video obstruction module 406 (the SDA I/O line 83/42)). At operation 650, the value of the CLR_IRQ is reset, which causes the IRQ signal to shift from a low signal (interrupt) to a high signal (no interrupt), resetting all registers of the video obstruction module 406 as indicated by the association of the off-page connector 688 in FIG. 7D with that of off-page connectors 690 and 676 in FIG. 7C, and off-page connector 678 in FIG. 7A. This process prevent continuous transmission of interrupt signal (IRQ=low) from the video obstruction module 406 to the video signal processing module 512 while the video signal processing module 512 continues to evaluate the originally received IRQ low signal at operation 640 (FIG. 7C).

As further illustrated in FIG. 7D, the MCU 540 of the video signal processing module 512 continues to process the originally forwarded interrupt signal IRQ=low by evaluation of the previously saved copied values of the registers CLR_IRQ saved in temp1 and OB_DETECTED saved in temp2. The MCU 540 of the video signal processing module 512 at operation 652 determines if both Temp1 (the original saved copied value from CLR_IRQ register before it was rest at operation 648) and Temp2 (the saved value from the OB_DETECTED) are set to "1," and if so, commence further evaluation for potentially triggering an alarm for obstruction of the camera 502, otherwise, reset all registers.

As illustrated in FIG. 7D, if the conditions at operation 652 are positive, the MCU 540 of the video signal processing module 512 at operations 654 and 656 (FIG. 7E via the illustrated association between off-page connectors 692 in FIG. 7D and off-page connector 694 in FIG. 7E) receives a voltage signal from a photo-sensor (described in detail below in relation to FIG. 6E), converts the photo-sensor signal to data, and at operation 656 determines if the ambient conditions sensed by the photo-sensor are normal (e.g., normal day light). According, if IRQ is finally confirmed as low (operation 652) and the ambient light condition information from a photo-sensor indicates a normal lighting condition (operation 656), then at operation 660 the video signal processing module 512 triggers an alarm if video obstruction alarm has been set to active (operation 658); otherwise, if the ambient light condition is not normal (e.g., it is night time and the lights are off), then no alarm is triggered where the video signal processing module 512 shifts to operation 640 (illustrated by the association of the off-page connectors 696 in FIG. 7E, off-page connectors 68 and 684 in FIG. 7D, and off-page connector 686 in FIG. 7C) ready to read another interrupt signal (if any).

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A public view monitor, comprising:
   an embedded camera that captures images;
   a video signal processor circuitry comprised of a Microcontroller Unit (MCU) that receives the captured images from the camera; and
   a video obstruction circuitry in communication with the video signal processor circuitry to determine obstruction of the camera, including:
   continuously receiving consecutive composite video baseline signal frames from the video signal processor circuitry, and comparing a frame and a next, subsequent consecutive frame for differences in light conditions and spatial noise for a specified number of consecutive frames to determine if criteria for existence of obstruction is met;
   if the video obstruction circuitry determines that criteria for existence of obstruction is met, the video obstruction module transmits an interrupt request signal (IRQ) to the video signal processor circuitry to commence further evaluations for obstruction and possible actuation and trigger of an alarm;
   the video signal processor circuitry receiving the IRQ determines whether the IRQ is low, if IRQ is finally confirmed as low and ambient light condition information from a photo-sensor indicates a normal lighting condition, then the video signal processor circuitry triggers the alarm if video obstruction alarm has been set to active.

2. The public view monitor as set forth in claim 1, wherein:
   the embedded camera records and transmits an analog video signal to a first media player;
   the first media player converts the transmitted analog video signal into a first digital signal for storage onto a first removable media;
   the first media player converts the first digital signal into the analog video signal, and transmits the analog video signal to a noise filter module on a video signal processing board.

3. The public view monitor as set forth in claim 2, wherein:
   the analog video signal transmitted by the camera is a Composite Video Baseband Signal (CVBS).

4. The public view monitor as set forth in claim 2, wherein:
   the first media player is a mini-digital video recorder.

5. The public view monitor as set forth in claim 4, wherein:
   the video signal processing board includes the video signal processor circuitry for processing the analog video signal.

6. The public view monitor as set forth in claim 5, wherein:
   the video signal processor circuitry receives a transmitted analog video signal from the first media player and converts the analog video signal to digital video signal for further processing.

7. The public view monitor as set forth in claim 6, wherein:
   the video signal processor circuitry processes the digital video signal for display of recorded video on a display panel.

8. The public view monitor as set forth in claim 5, wherein:
   the video signal processor circuitry is a video scaler with the microcontroller unit (MCU).

9. The public view monitor as set forth in claim 5, wherein:
   the video signal processor circuitry includes at least:
   a video decoder that has an analog to digital converter to digitize the analog video signal, and decode the digital video signal for further processing and display;
   a scaler that converts the received digital video signal from one display resolution to another; and
   the microcontroller unit (MCU).

10. The public view monitor as set forth in claim 9, wherein:
    the video decoder detects presence or absence of video signal, the results of which are communicated with the MCU of the video signal processor circuitry;
    if no video signal is detected, the MCU determines if an alarm feature for lack of video signal was set to be activate and if so, MCU transmits a signal to trigger alarm.

11. The public view monitor as set forth in claim 5, wherein:
    a clock rate of the video signal processor circuitry is determined by a frequency of an oscillator.

12. The public view monitor as set forth in claim 5, further comprising:
    a motion sensor for detecting motion, with a motion sensing signal communicated with the video signal processor circuitry to enable the MCU of the video signal processor circuitry to trigger an audio recorder coupled with a speaker.

13. The public view monitor as set forth in claim 12, wherein:
    a second media player includes a audio input and activation switch to enable recording of audio content for later playback.

14. The public view monitor as set forth in claim 12, wherein:
    the motion sensor is a camera motion sensor.

15. The public view monitor as set forth in claim 1, wherein:
    the embedded camera further includes a motion sensor.

16. The public view monitor as set forth in claim 1, wherein:
    the photosensor is a photodiode light sensor.

17. The public view monitor as set forth in claim 16, wherein:
the photodiode is a Cadmium Sulphide (CdS) photoresistor.

18. The public view monitor as set forth in claim 17, wherein:
the output of the photosensor is associated with an input port of the video signal processor circuitry.

19. The public view monitor as set forth in claim 1, further comprising:
a transducer circuit for actuating a transducer module to generate audible alarm.

20. The public view monitor as set forth in claim 1, further comprising:
a sensor switch that indicates if a back door panel is open.

21. The public view monitor as set forth in claim 1, further comprising:
one or more removable media.

22. The public view monitor as set forth in claim 1, further comprising:
a housing that is detachably secured onto a structure.

23. The public view monitor as set forth in claim 1, further comprising:
an auxiliary power supply.

24. The public view monitor as set forth in claim 1, further comprising:
a sensor for detection of magnitude and direction of proper acceleration as a vector quantity to sense orientation.

25. The public view monitor as set forth in claim 24, wherein:
the sensor is a G-sensor.

26. The public view monitor as set forth in claim 25, wherein:
the G-sensor is comprised of single- and multi-axis accelerometer.

27. The public view monitor as set forth in claim 26, wherein:
the video signal processor circuitry is coupled with the G-sensor.

28. The public view monitor as set forth in claim 27, wherein:
the video signal processor circuitry receives orientation information from the G-sensor and determines a current orientation of the public view monitor compared with a reference orientation, which is a previously determined orientation of the public view monitor, and determines if the current orientation is different from the previously set orientation and if so, the video signal processor circuitry triggers an alarm for a predetermined period and resets the current orientation as a new reference orientation.

29. The public view monitor as set forth in claim 1, further comprising:
a power failure detection module.

30. The public view monitor as set forth in claim 29, wherein:
the power failure detection module includes a switch that is coupled with a main power source and an auxiliary power source, and is biased to supply power via the main power source during normal operation, and is biased to supply power via the auxiliary power source during failure of the main power source;
wherein the failure of the main power source causes the switch to trigger the alarm.

* * * * *